United States Patent
Hataida et al.

(10) Patent No.: US 6,546,501 B1
(45) Date of Patent: Apr. 8, 2003

(54) CACHE MEMORY APPARATUS AND COMPUTER READABLE RECORDING MEDIUM ON WHICH A PROGRAM FOR CONTROLLING A CACHE MEMORY IS RECORDED

(75) Inventors: Makoto Hataida, Kanagawa (JP); Manabu Nakao, Kanagawa (JP); Toshiyuki Muta, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/531,014

(22) Filed: Mar. 20, 2000

(30) Foreign Application Priority Data

Sep. 8, 1999 (JP) .............................. 11-254218

(51) Int. Cl.[7] .................................. G06F 11/00
(52) U.S. Cl. ........................................ 714/6; 711/133
(58) Field of Search ........................ 714/6, 7, 25, 41, 714/42, 44, 47, 48, 54; 711/131, 133, 134, 143

(56) References Cited

U.S. PATENT DOCUMENTS 5,226,150 A * 7/1993 Callander et al. ........... 395/575
5,615,334 A * 3/1997 Wang et al. ............ 395/185.01
5,629,950 A * 5/1997 Godiwala et al. .......... 371/51.1
5,630,055 A * 5/1997 Bannon et al. ......... 395/185.05
5,963,718 A * 10/1999 Muramatsu ............ 395/185.07
6,408,417 B1 * 6/2002 Moudgal et al. ............ 714/764
6,467,048 B1 * 10/2002 Olarig et al. .................. 714/7

FOREIGN PATENT DOCUMENTS

| JP | HEI 5-346890 A | 12/1993 |
| JP | HEI 7-248970 A | 9/1995 |

* cited by examiner

Primary Examiner—Nadeem Iqbal
(74) Attorney, Agent, or Firm—Staas & Halsey LLP

(57) ABSTRACT

A cache memory apparatus includes a primary cache memory using a 4-way set associative method and a secondary cache memory. When a parity error occurs in an entry in the primary cache memory, the way is prohibited from being replaced, and data related to the entry is written back from the primary cache memory to the secondary cache memory. Thereafter, the entry in the primary cache memory is made invalid, and the prohibition on the replacement of the way is released. When the secondary cache memory is accessed, the data written back is moved from the secondary cache memory to the entry into the primary cache memory to set a status before the parity error occurs.

10 Claims, 21 Drawing Sheets

FIG.2A | STATUS [1:0] | SP | ADR [40:14] | AP |

FIG.2B

| STATUS | [1] | [0] |
|---|---|---|
| M | 1 | 1 |
| C | 1 | 0 |
| I | 0 | X |

FIG.2C | MODE | WAY [1:0] | ADR [40:0] |

FIG.2D | INDEX [13:0] |

FIG.2E | WAY [1:0] | INDEX [7:0] |

FIG.2F | STATUS [2:0] | INCL | WAY [1:0] | ADR [40:20] | AP |

FIG.2G

| STATUS | [2] | [1] | [0] |
|---|---|---|---|
| M | 1 | 1 | 1 |
| O | 1 | 0 | 1 |
| E | 1 | 1 | 0 |
| S | 1 | 1 | 0 |
| I | 0 | X | X |

FIG.2H | STATUS [1:0] | ADR [40:14] | AP |

FIG.2I | INCL | STATUS [2:0] | ADR [40:20] |

FIG.2J | FLAG | INDEX [13:6] |

FIG.5

| INPUT [3:0] | | OUTPUT [3:0] |
|:---:|:---:|:---:|
| 1 X X X | ⟶ | 1 0 0 0 |
| 0 1 X X | ⟶ | 0 1 0 0 |
| 0 0 1 X | ⟶ | 0 0 1 0 |
| 0 0 0 X | ⟶ | 0 0 0 1 |

FIG.7

| | ORDER OF BIT PRIORITY |
|---|---|
| PRIORITY SELECTOR 106h | 3 > 2 > 1 > 0 |
| PRIORITY SELECTOR 106i | 2 > 1 > 0 > 3 |
| PRIORITY SELECTOR 106j | 1 > 0 > 3 > 2 |
| PRIORITY SELECTOR 106k | 0 > 3 > 2 > 1 |

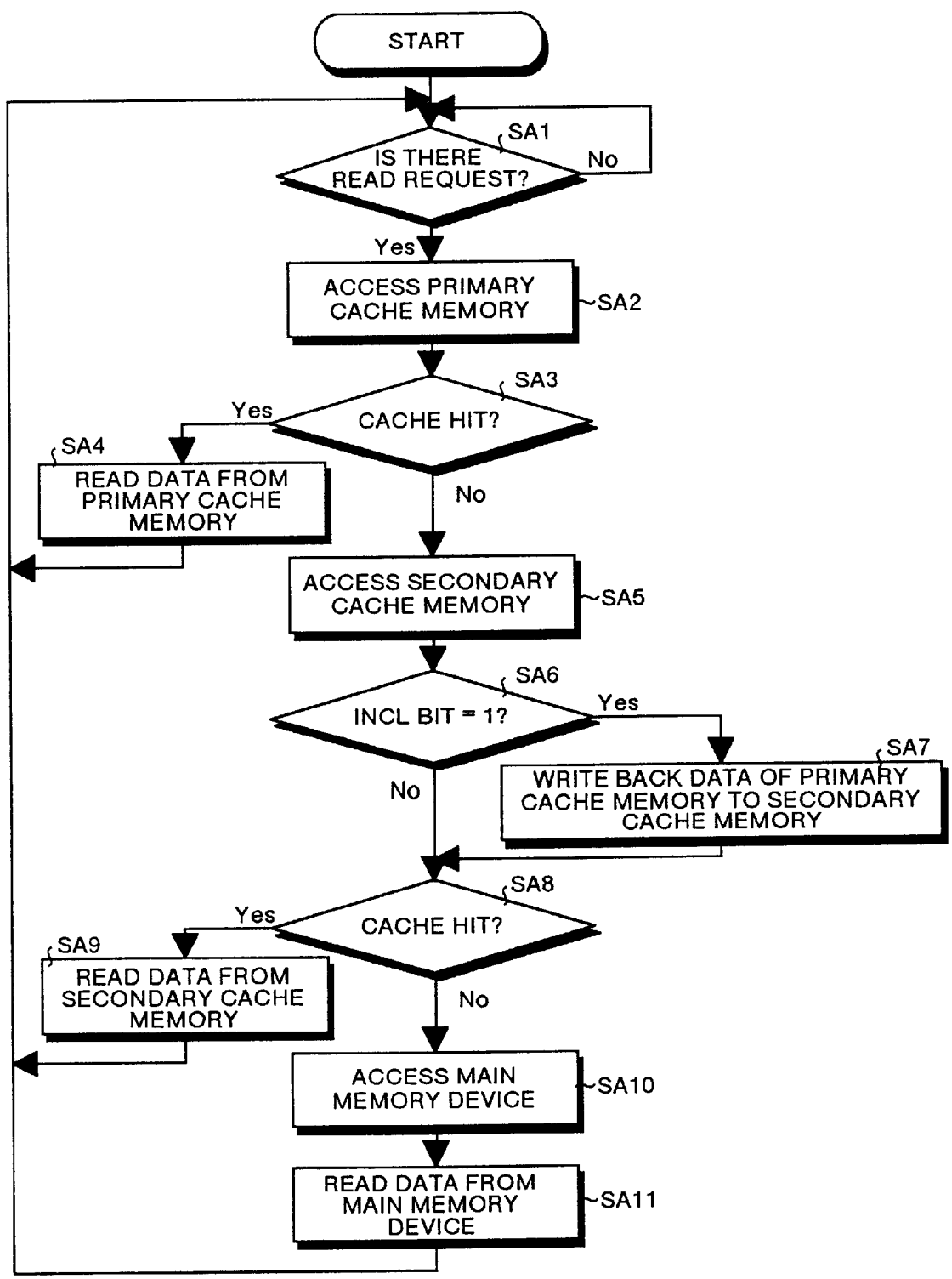

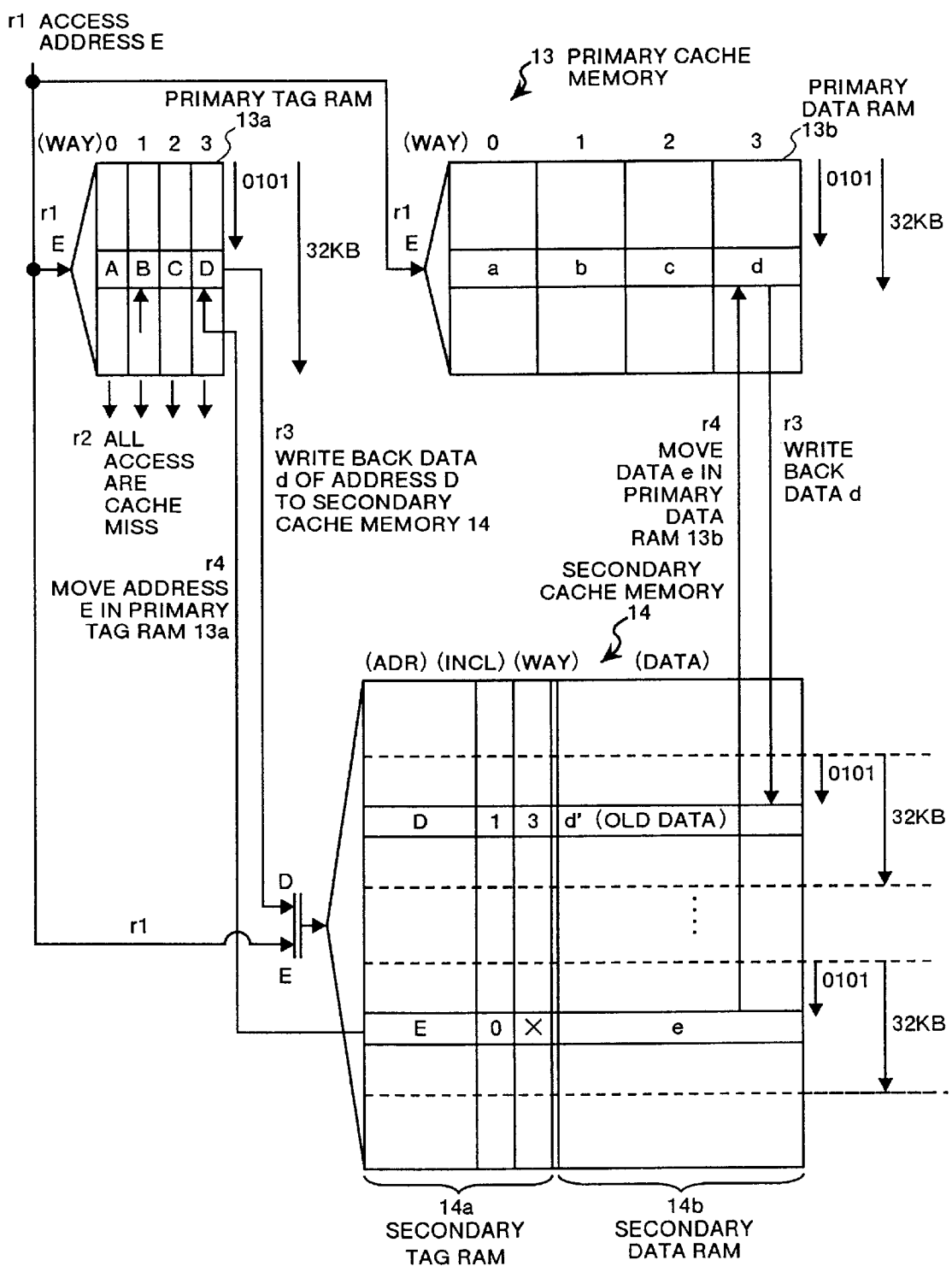

CACHE MEMORY APPARATUS AND COMPUTER READABLE RECORDING MEDIUM ON WHICH A PROGRAM FOR CONTROLLING A CACHE MEMORY IS RECORDED

FIELD OF THE INVENTION

The present invention relates to a cache memory apparatus having a plurality of cache memories and a computer readable recording medium on which a program for controlling the cache memory is recorded thereon. More particularly, this invention relates to a cache memory apparatus being capable of avoiding system down caused by occurrence of a parity error and a computer readable recording medium on which a program for controlling the cache memory is recorded thereon.

BACKGROUND OF THE INVENTION

With popularization of personal computers, high-speed performance is further demanded. Accordingly, systems each comprising a cache memory apparatus constituted by a plurality of cache memories to achieve high-speed access are popularly used. On the other hand, since an amount of processing performed by a computer increases, emphasis is required to be given on the improvement in reliability of such systems. It is also desired that the system continues to operate without stopping the system even if a minor failure occurs.

FIG. 19 is a block diagram showing the configuration of a conventional cache memory apparatus. The cache memory apparatus shown in FIG. 19 comprises a multiple cache memory (primary cache memory 13 and secondary cache memory 14) to eliminate a difference in the processing speed between a CPU (Central Processing Unit) 11 and a main memory device 16. The CPU 11 accesses the primary cache memory 13, the secondary cache memory 14, or the main memory device 16 to read/write data. The main memory device 16 is a hard disk drive for example. The main memory device 16 has, as characteristic features, a large capacity and an access time which is longer than that of the primary cache memory 13 or the secondary cache memory 14. All the data that is used by the CPU 11 is stored in the main memory device 16.

The primary cache memory 13 and the secondary cache memory 14 are SRAMs (Static Random Access Memories) for example, and has, as characteristic features, an access time which is-shorter than that of the main memory device 16. The primary cache memory 13 also has, as characteristic features, an access time which is shorter than that of the secondary cache memory 14. More specifically, of the primary cache memory 13, the secondary cache memory 14, and the main memory device 16, the primary cache memory 13 has the shortest access time, the secondary cache memory 14 has an access time which is longer than that of the primary cache memory 13, and the main memory device 16 has the longest access time. In addition, with respect to a memory capacity, the memory capacity of the main memory device 16 is largest, the memory capacity of the secondary cache memory 14 is second largest, and the memory capacity of the primary cache memory 13 is the smallest.

Data transmission between a CPU and a cache memory (main memory device) is generally performed in units of lines. Several methods are available which allow data on the main memory device to correspond to lines in the cache memory. As a typical method, the following set associative method is known. That is, the main memory device and the cache memory are divided into a plurality of sets (set of lines: called a way), and data on the main memory device can be placed on determined lines in the way. The set associative method including N ways is called an N-way set associative method. A method in which a cache memory is handled as one way is called a direct mapping method (or one-way set associative method).

The primary cache memory 13 stores a part of the data stored in the main memory device 16, and is a memory using a 4-way set associative method as shown in FIG. 21. As shown in FIG. 21, primary cache memory 13 is constituted by a primary tag RAM 13a for holding addresses A, B, C, and D or the like of data a, b, c, and d or the like, and a primary data RAM 13b for holding the data a, b, c, and d or the like. The primary tag RAM 13a and the primary data RAM 13b are divided into a plurality of ways to be managed. The way of the primary tag RAM 13a and the way of the primary data RAM 13b correspond to each other in a one-to-one relationship. For example, the address A held in a unit (to be referred to as an entry) constituting way 0 in the primary tag RAM 13a and the data a held in the entry of way 0 in the primary data RAM 13b correspond to each other in a one-to-one relationship.

The secondary cache memory 14 is a memory for storing part of data held in the main memory device 16. This secondary cache memory 14 uses a direct mapping method. As shown in FIG. 21, the secondary cache memory 14 is constituted by a secondary tag RAM 14a for holding tag information consisting of an address ADR, an INCL bit, and a way WAY, and a secondary data RAM 14b for holding the real data. The address ADR represents the address of data held in the secondary data RAM 14b. The INCL bit represents whether corresponding data is held in the primary data RAM 13b or not. The INCL bit is "1" if the data is held in the primary data RAM 13b, and it is "0" if no data is held in the primary data RAM 13b. The way WAY represents the number of a way in the primary cache memory 13 in which the corresponding data is held.

Returning to FIG. 19, a primary cache access control device 12 controls access from the CPU 11 to the primary cache memory 13, and compares the address of data to be read with an address of the primary tag RAM 13a according to a read request from the CPU 11. When the addresses are equal to each other (this state is called cache hit), the primary cache access control device 12 performs control or the like to read the data corresponding to the address. On the other hand, when the addresses are not equal to each other (this state is called cache miss), the primary cache access control device 12 performs control to access the secondary cache memory 14. A secondary cache access control device 15 controls access from the CPU 11 to the secondary cache memory 14, and compares the address of data to be read with an address of the secondary tag RAM 14a. In case of cache hit, the secondary cache access control device 15 performs control or the like to read the data corresponding to the address. In case of cache miss, the secondary cache access control device 15 performs control or the like to access the main memory device 16.

With reference to the flow chart shown in FIG. 20 and the FIG. 19 and FIG. 21, the operation of a conventional cache memory apparatus will be explained below. In step SA1 shown in FIG. 20, the primary cache access control device 12 checks whether a read request is generated by the CPU 11. If the check result is "No", this check is repeated. The read request is a request that data should be read from the primary cache memory 13, the secondary cache memory 14 or the main memory device 16.

For example, when a read request for requesting that the data e of the address E shown in FIG. 21 should be read is generated by the CPU 11, the primary cache access control device 12 sets the check result in step SA1 as "Yes". In this manner, in step SA2, the primary cache access control device 12 accesses the primary cache memory 13 (r1 in FIG. 21) to compare the address E with an address held in the primary tag RAM 13a.

In step SA3, the primary cache access control device 12 checks whether the address E is present in the primary tag RAM 13a or not, i.e., whether cache hit is established or not. In this case, since the address E is not present in the primary tag RAM 13a, the primary cache access control device 12 determines cache miss (r2 in FIG. 21) to set the check result in step SA3 in "No". If the check result in step SA3 is "Yes", in step SA4, the CPU 11 reads a data corresponding to the address E from the primary data RAM 13b.

In step SA5, the secondary cache access control device 15 accesses the secondary cache memory 14 (r1 in FIG. 21). In step SA6, the secondary cache access control device 15 checks whether an INCL bit of "1" exists in the secondary tag RAM 14a. In this case, since the INCL bit of the address D is "1", the secondary cache access control device 15 sets the check result in step SA6 in "Yes" and then shifts the process to step SA7. When the INCL bit of "1" does not exist in the secondary tag RAM 14a, the secondary cache access control device 15 considers the check result in step SA6 as "No".

Since the INCL bit and the way are "1" and "3" respectively, with respect to the address D in the secondary cache memory 14, it is understood that the latest data d of the address D is held in way 3 in the primary data RAM 13b. Data d' corresponding to the address D in the secondary data RAM 14b is a data that is older than the data d, and it is the data that must be updated.

In step SA7, the secondary cache access control device 15 writes back the data of the corresponding address in the primary cache memory 13 to the secondary cache memory 14. More specifically, in this case, the secondary cache access control device 15 writes back the data d (latest data) existing in the primary data RAM 13b to a region corresponding to the address D in the secondary data RAM 14b with reference to the address D existing in way 3 of the primary tag RAM 13a (r3 in FIG. 21). In this manner, the data d' (old data) corresponding to the address D in the secondary data RAM 14b is updated to the data d (latest data).

In step SA8, the secondary cache access control device 15 checks whether an address E exists in the secondary tag RAM 14a or not, i.e., whether cache hit is established or not. In this case, since the address E exists in the secondary tag RAM 14a, the secondary cache access control device 15 considers the check result in step SA8 as "Yes". In the next step SA9, the CPU 11 reads data e corresponding to the address E from the secondary data RAM 14b. The secondary cache access control device 15 moves the read data e and the address E of the data e from the secondary cache memory 14 into the primary cache memory 13 (r4 in FIG. 21).

When some data exists in the secondary cache memory 14, and that data does not exist in the primary cache memory 13, the data is moved from the secondary cache memory 14 into the primary cache memory 13 to shorten an access time for the data next time. In this case, the secondary cache access control device 15 updates the address D of way 3 in the primary tag RAM 13a to the address E in the secondary tag RAM 14a. Similarly, the secondary cache access control device 15 updates the data d of way 3 in the primary data RAM 13b to the data e in the secondary data RAM 14b.

On the other hand, if the check result in step SA8 is "No", the CPU 11 accesses the main memory device 16 in step SA10. In step SA11, the CPU 11 reads the data corresponding the address E from the main memory device 16. In this manner, in the conventional cache memory apparatus, when data corresponding to a certain address is to be read, the CPU 11 accesses the primary cache memory 13, then the secondary cache memory 14, and finally the main memory device 16.

As described above, in the conventional cache memory apparatus, as shown in FIG. 21, at a certain timing, the data d (latest data) held in the primary cache memory 13 (primary data RAM 13b) is written back to the secondary cache memory 14 (secondary data RAM 14b), so that the data d' (old data) is updated to the latest data. In this case, the data d is written back to the region of the address D in the secondary cache memory 14 with reference to the address D of the data d in the primary tag RAM 13a.

Recently, in answer to a request for a reduction in size and high-density storage, integrated circuits each having a high degree of integration have been frequently used as the memory elements in the primary cache memory 13 and the secondary cache memory 14. In such an integrated circuit having a high degree of integration, since the constituent parts of the circuit are minute, it is known that, in addition to a hardware error which is a fixed failure such as disconnection of the circuit itself, a failure called a software error occurs. This software error is a phenomenon in which bits are inverted at random due to a small radiation from a very minute radiation source contained in the package of the integrated circuit that envelops the memory elements.

In this manner, in case of write back, when the software error occurs in the address D of the primary tag RAM 13a shown in FIG. 21, an address to which the data is written back becomes unknown. Therefore, data d cannot be written back to the region of the address D in the secondary cache memory 14. In this case, a serious failure that causes immediate system down occurs, and the reliability of the apparatus is degraded. In particular, since the degrees of integration of circuits is increasing every year, the probability of occurrence of the software errors is also increasing. An effective solution to the problem is earnestly desired.

SUMMARY OF THE INVENTION

It is an object of this invention to provide a cache memory apparatus capable of avoiding system down and capable of improving the reliability of the apparatus, and a computer readable recording medium on which a program for controlling the cache memory is recorded thereon.

In order to achieve the object, the present invention according to one aspect provides a cache memory apparatus including a primary cache memory having at least one way, which way having at least one entry; an error detection unit which detects an error in an entry of the way; a secondary cache memory which holds data, a registration position information and a status information of data in said first cache memory; a replace prohibition unit which, when error is detected in an entry of a way by said error detection unit, prohibits that particular way from being replaced; a write back unit which, when an error is detected in an entry of a way by said error detection unit, writes back the data held in that particular entry of the way in said primary cache memory to an entry of said secondary cache memory; a release unit which releases the prohibition of replacement of that particular way of said primary cache memory upon completion of the write back operation by said write back unit; and a write unit which, when the entry of said secondary cache memory is accessed, writes the data which is written back in the entry in said primary cache memory.

According to the present invention of the above aspect, when a parity error occurs in the entry of the primary cache memory, the way including the entry in which the error is detected is prohibited by the replace prohibition unit from being replaced, and the data held in the entry is written back to the entry of the secondary cache memory by the write back unit. In this manner, data obtained before the parity error occurs is held in the secondary cache memory. Upon completion of the write back operation, the prohibition of replacement is released by the release unit, and the data which is written back is written in the entry of the primary cache memory by the write unit, so that the status before the parity error occurs is set.

Thus, when a parity error occurs, after the data is written back from the primary cache memory to the secondary cache memory, the data is written from the secondary cache memory into the primary cache memory. Thus, even if a parity error occurs, the data can be normally read from the secondary cache memory. Therefore, according to the present invention of the first aspect, even if a parity error occurs in the primary cache memory, system down is avoided, and the reliability of the apparatus is improved.

The present invention according to another aspect provides a cache memory apparatus including a primary cache memory having at least one way, which way having at least one entry; an error detection unit which detects an error in an entry of the way; a secondary cache memory which holds data, a registration position information and a status information of data in said first cache memory; a replace prohibition unit which, when error is detected in an entry of a way by said error detection unit, prohibits that particular entry of the way from being replaced; a write back unit which, when error is detected in an entry of a way by said error detection unit, writes back the data held in that particular entry of the way in said primary cache memory to an entry of said secondary cache memory; a release unit which releases the prohibition of replacement of that particular entry of the way in said primary cache memory upon completion of the write back operation by said write back unit; and a write unit which, when the entry of said secondary cache memory is accessed, writes the data which is written back in the entry in said primary cache memory.

According to the present invention of the above aspect, when a parity error occurs in the entry of the primary cache memory, the entry in which the error is detected is prohibited by the replace prohibition unit from being replaced, and the data held in the entry is written back to the entry of the secondary cache memory by the write back unit. In this manner, data obtained before the parity error occurs is held in the secondary cache memory. Upon completion of the write back operation, the prohibition of replacement is released by the release unit, and the data which is written back is written in the entry of the primary cache memory by the write unit, so that the status before the parity error occurs is set.

Thus, when a parity error occurs, after the data is written back from the primary cache memory to the secondary cache memory, the data is written from the secondary cache memory into the primary cache memory. Therefore, even if a parity error occurs in the primary cache memory, system down is avoided, and the reliability of the apparatus is improved. Further, since an object to be prohibited from being replaced is narrowed to the entry, another entry which can be used in this way is not prohibited from being accessed.

Further, a write back operation is performed at the moment an error is detected by the error detection unit. Therefore, a period of time extending from when a parity error occurs to when the status before the parity error occurs in the primary cache memory can be shortened.

Further, a write back operation is performed at any timing after the error is detected by the error detection unit. Therefore, when the parity error occurs, the parity error does not adversely affect access to another entry pending.

The present invention according to still another aspect provides a cache memory apparatus including a primary cache memory having a plurality of entries; an auxiliary memory having a plurality of entries whose bit fields are equal to those of entries in said primary cache memory; an error detection unit which detects an error in an entry of said primary cache memory; a secondary cache memory which holds data, a registration position information and a status information of data in said first cache memory; an auxiliary memory selection unit which, when an error is detected in an entry of said primary cache memory, makes a corresponding entry in said auxiliary memory valid in place of the entry of said primary cache memory in which the error has occurred; a write back unit which, when an error is detected in an entry of said primary cache memory, writes back the data held in that particular entry of said primary cache memory to an entry of said secondary cache memory; and a write unit which writes the data which is written back in an entry in said auxiliary memory upon completion of the write back operation by said write back unit.

According to the present invention of the above aspect, when an error in the entry of the primary cache memory is detected by the error detection unit, an auxiliary memory is selected by the auxiliary memory selection unit in place of the entry. The data held in the entry is written back to the entry of the secondary cache memory by the write back unit. In this manner, data obtained before the parity error occurs is held in the secondary cache memory. Upon completion of the write back operation, the data which is written back is written in the entry in the auxiliary memory by the write unit.

Thus, when a parity error occurs in the entry of the primary cache memory, the auxiliary memory is used as a backup in place of the entry. Therefore, the cache memory apparatus can be operated as if no parity error occurs.

The present invention according to still another aspect provides a computer readable recording medium on which a program for controlling a cache memory is recorded thereon, which program causes a computer to execute an error detection step of detecting an error in an entry of a way of a primary cache memory, which primary cache memory having at least one way, and which way having at least one entry; a replace prohibition step of, when an error is detected in an entry of a way in the error detection step, prohibiting that particular way from being replaced; a write back step of, when an error is detected in an entry of a way in the error detection step, writing back the data held in that particular entry of the way in said primary cache memory to an entry of a secondary cache memory, which secondary cache memory holds data, registration position information and status information of data in said primary cache memory; a release step of releasing the prohibition of replacement of that particular way of said primary cache memory upon completion of the write back operation in the write back step; and a write step of, when the entry of said secondary cache memory is accessed, writing the data which is written back in the entry in said primary cache memory.

According to the present invention of the above aspect, when a parity error occurs in the entry of the primary cache memory, the way including the entry in which the error is detected is prohibited by the replace prohibition step from being replaced, and the data held in the entry is written back to the entry of the secondary cache memory by the write back step. In this manner, data obtained before the parity error occurs is held in the secondary cache memory. Upon completion of the write back operation, the prohibition of replacement is released in the release step, and the data which is written back is written in the entry of the primary cache memory in the write step, so that a status before the parity error occurs is set.

Thus, when a parity error occurs, data is written back from the primary cache memory to the secondary cache memory and then written from the secondary cache memory in the primary cache memory. For this reason, even if the parity error occurs, the data can be normally read from the secondary cache memory. Therefore, even if a parity error occurs in the primary cache memory, system down is avoided, and the reliability of the apparatus is improved.

The present invention according to still another aspect provides a computer readable recording medium on which a program for controlling a cache memory is recorded thereon, which program causes a computer to execute an error detection step of detecting an error in an entry of a way of a primary cache memory, which primary cache memory having at least one way, and which way having at least one entry; a replace prohibition step of, when an error is detected in an entry of a way in the error detection step, prohibiting that particular entry from being replaced; a write back step of, when an error is detected in an entry of a way in the error detection step, writing back the data held in that particular entry of the way in said primary cache memory to an entry of a secondary cache memory, which secondary cache memory holds data, registration position information and status information of data in said primary cache memory; a release step of releasing the prohibition of replacement of that particular entry of said primary cache memory upon completion of the write back operation in the write back step; and a write step of, when the entry of said secondary cache memory is accessed, writing the data which is written back in the entry in said primary cache memory.

According to the present invention of the above aspect, when a parity error occurs in the entry of the primary cache memory, the entry in which the error is detected is prohibited by the replace prohibition step from being replaced, and the data held in the entry is written back to the entry of the secondary cache memory by the write back step. In this manner, data obtained before the parity error occurs is held in the secondary cache memory. Upon completion of the write back operation, the prohibition of replacement is released by the release step, and the data which is written back is written in the entry of the primary cache memory by the write step, so that a status before the parity error occurs is set.

Thus, when a parity error occurs, data is written back from the primary cache memory to the secondary cache memory and then written from the secondary cache memory in the primary cache memory. For this reason, even if the parity error occurs in the primary cache memory, system down is avoided, and the reliability of the apparatus is improved.

Therefore, since an object to be prohibited from being replaced is narrowed to the entry, another entry which can be used in this way is not prohibited from being accessed.

The present invention according to still another aspect provides a computer readable recording medium on which a program for controlling a cache memory is recorded thereon, which program causes a computer to execute an error detection step of detecting an error in an entry of a primary cache memory, which primary cache memory having a plurality of entries; an auxiliary memory selection step of, when an error is detected in the error detection step, making an auxiliary memory valid in place of the entry of said primary cache memory in which the error has occurred, which auxiliary memory having a plurality of entries whose bit fields are equal to those of entries in said primary cache memory; a write back step of, when an error is detected in the error detection step, writing back the data held in that particular entry in said primary cache memory to an entry of a secondary cache memory, which secondary cache memory holds data, a registration position information and a status information of data in said first cache memory; and a write step of writing the data which is written back in an entry in said auxiliary memory upon completion of the write back operation in the write back step.

According to the present invention of the above aspect, when an error in the entry of the primary cache memory is detected in the error detection step, an auxiliary memory is selected in the auxiliary memory selection step in place of the entry. The data held in the entry is written back to the entry of the secondary cache memory in the write back step. In this manner, data obtained before the parity error occurs is held in the secondary cache memory. Upon completion of the write back operation, the data which is written back is written in the entry in the auxiliary memory in the write step.

Thus, when a parity error occurs in the entry of the primary cache memory, the auxiliary memory is used as a backup in place of the entry. Therefore, the cache memory apparatus can be operated as if no parity error occurs.

Other objects and features of this invention will become apparent from the following description with reference to the accompanying drawings.

BRIEF DESCRIPTION OF THE DRAWINGS

FIGS. 2A to 2J are diagrams showing various data structures in first and second embodiments.

FIG. 5 is a truth table of a priority selector 106c shown in FIG. 4.

FIG. 7 is a table showing the order of bit priority in priority selectors 106h to 106k shown in FIG. 6.

FIG. 20 is a flow chart for explaining a write back operation in the cache memory apparatus.

FIG. 21 is a diagram for explaining the operation of a conventional cache memory apparatus.

DESCRIPTION OF THE PREFERRED EMBODIMENTS

Two embodiments of a cache memory apparatus according to the present invention and a computer readable recording medium, on which a program for controlling the cache memory is recorded thereon, according to the present invention are explained below with reference to the accompanying drawings.

Figure 1:
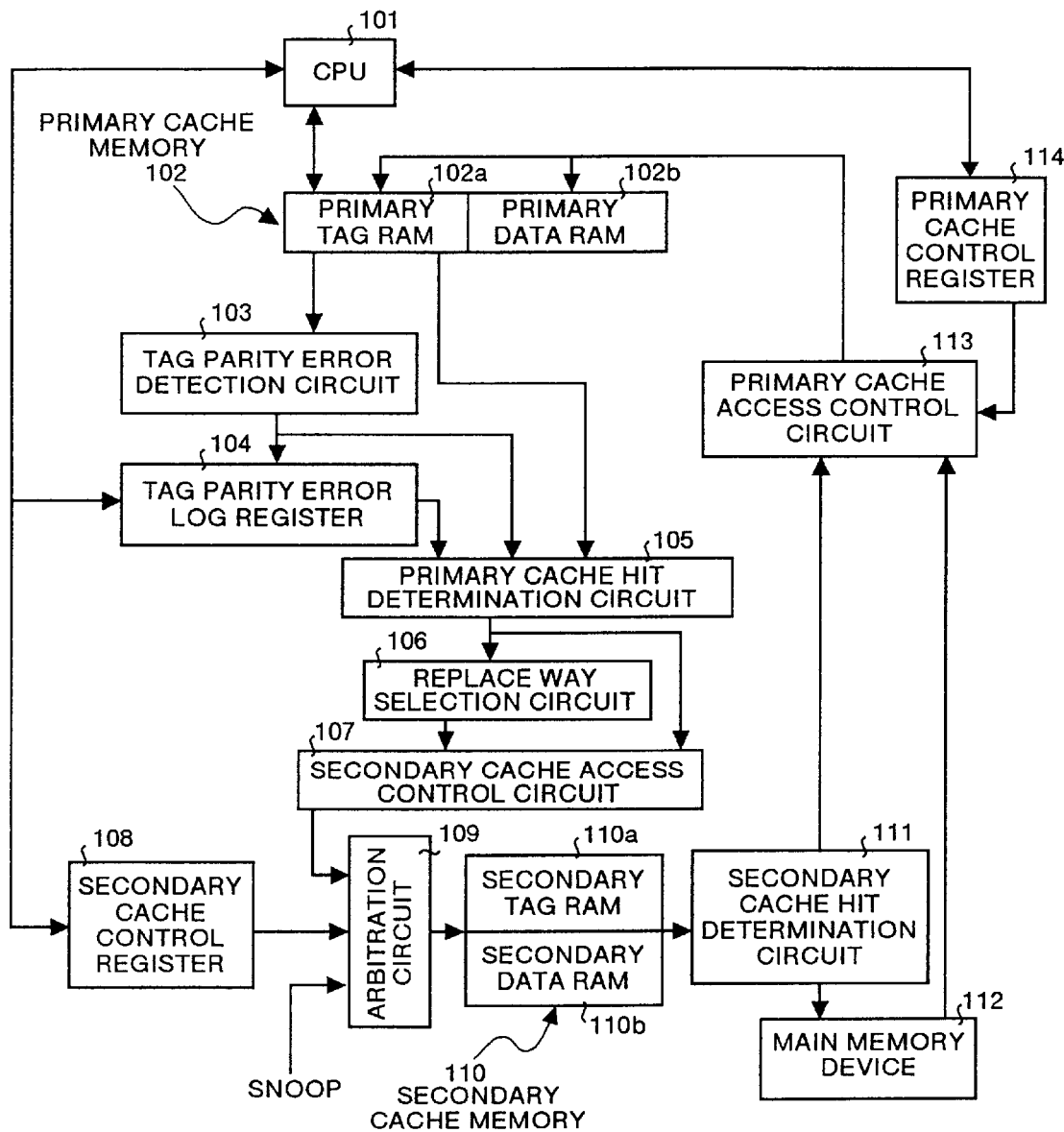
FIG. 1 is a block diagram showing the configuration of a first embodiment according to the present invention.

FIG. 1 is a block diagram showing the configuration of a cache memory apparatus according to the first embodiment of to the present invention. The cache memory apparatus shown in FIG. 1 comprises a multiple cache memory (primary cache memory 102 and secondary cache memory 110) to eliminate a difference in the processing speed between a CPU 101 and a main memory device 112 in the same manner as in the prior art. The CPU 101 accesses the primary cache memory 102, the secondary cache memory 110, or the main memory device 112 to read/write data. The main memory device 112 is a hard disk drive, for example, and has, as characteristics, a large capacity and an access time which is longer than that of the primary cache memory 102 or the secondary cache memory 110. All data used in the CPU 101 are stored in the main memory device 112.

The primary cache memory 102 and the secondary cache memory 110 are SRAMs, for example. The primary cache memory 102 and the secondary cache memory 110 have, as characteristics, access times which are shorter than the access time of the main memory device 112. The primary cache memory 102 also has, as characteristics, an access time which is shorter than the access time of the secondary cache memory 110. More specifically, of the primary cache memory 102, the secondary cache memory 110, and the main memory device 112, the primary cache memory 102 has the shortest access time, the secondary cache memory 110 has an access time which is second shortest, and the main memory device 112 has the longest access time. Regarding the memory capacity, the memory capacity of the main memory device 112 is largest, the memory capacity of the secondary cache memory 110 is second largest, and the memory capacity of the primary cache memory 102 is smallest.

Figure 9:
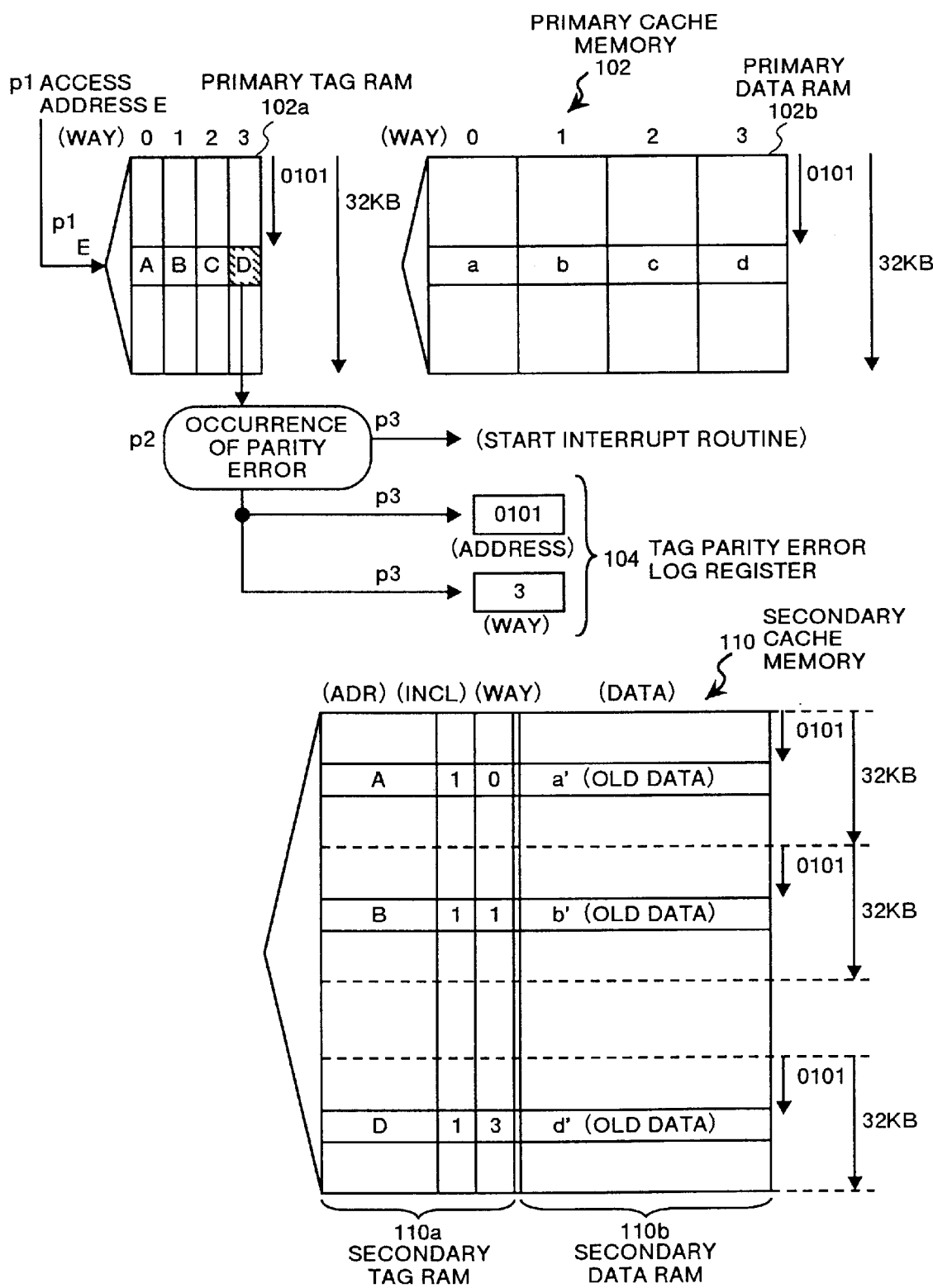
FIG. 9 is a diagram for explaining an operation performed in the first embodiment when a parity error occurs.

The primary cache memory 102 stores a part of the data stored in the main memory device 112, and is a memory using a 4-way set associative method as shown in FIG. 9. The primary cache memory 102 is constituted by a primary tag RAM 102a and a primary data RAM 102b in the same manner as the primary cache memory 13 (see FIG. 21). The primary tag RAM 102a has a capacity of 4 ways×256×64 bytes. A tag information shown in FIG. 2A is held in the entries of the primary tag RAM 102a, respectively. In FIG. 2A, a status STATUS is information representing the status of data held in the primary data RAM 102b, and this status STATUS denotes one of M (Modified), C (Clean), and I (Invalid) shown in FIG. 2B. Status M denotes that the data is valid and that the data is updated one. Further, when the status is M it denotes that the data are not equal to data held in a secondary data RAM 110b corresponding to the data. In this case, the data held in the primary data RAM 102b must be written back to the secondary data RAM 110b.

Status C denotes that the data held in the primary data RAM 102b is valid and that the data is not updated one. Further, when the status is C it denotes that the data is equal to data held in the secondary data RAM 110b corresponding to the data. Therefore, a write back operation need not be performed. Status I denotes that the corresponding entry is unused and that the data held in the primary data RAM 102b is invalid one.

Returning to FIG. 2A, a parity bit SP is an odd-number parity bit added to the status STATUS, and is used to check whether a parity error occurs in the status STATUS or not by the odd-number parity check method. Address ADR is an address of data held in the primary data RAM 102b. A parity bit AP is an odd-number parity bit added to the address ADR, and is used to check whether a parity error occurs in the address ADR by the odd-number parity check method.

A model of the primary cache memory 102 is shown in FIG. 9. As shown in FIG. 9, the primary cache memory 102 holds data a, b, c, and d or the like and addresses A, B, C, and D or the like (corresponding to the address ADR in FIG. 2A) corresponding to the data a, b, c, and d in the same manner as the primary cache memory 13 (see FIG. 21). FIG. 9 shows only the address ADR of the tag information shown in FIG. 2A. The primary tag RAM 102a and the primary data RAM 102b are managed such that each of the primary tag RAM 102a and the primary data RAM 102b is divided into ways 0 to 3. The ways of the primary tag RAM 102a and the ways of the primary data RAM 102b correspond to each other in a one-to-one relationship. For example, address A held in an entry constituting way 0 in the primary tag RAM 102a and data a held in an entry of way 0 in the primary data RAM 102b correspond to each other in a one-to-one relationship.

Returning to FIG. 1, a tag parity error detection circuit 103 is a circuit for detecting a parity error of tag information in the accessed primary tag RAM 102a. More specifically, when a parity error is detected in the status STATUS or the address ADR shown in FIG. 2A, the tag parity error detection circuit 103 makes a parity error signal active, and the tag parity error detection circuit 103 outputs the way number of an entry in which a parity error occurs and the information of the corresponding address to a tag parity error log register 104 and a primary cache hit determination circuit 105. The tag parity error log register 104 is a register for holding information related to the error shown in FIG. 2C when a parity error is detected by the tag parity error detection circuit 103.

In FIG. 2C, a mode MODE is a flag representing the mode of the apparatus. When the mode is a parity error mode, "1" is set. When the mode is a normal operation mode, "0" is set.

A way WAY is the number of a way having an entry in which a parity error occurs in the primary tag RAM 102a, and the address ADR is the address of the entry in which the parity error occurs. FIG. 9 shows, as an example, the address ADR (address: 0101) and the way WAY (way: 3). When the mode changes from the parity error mode to the normal operation mode, the tag parity error log register 104 is cleared under the control of the CPU 101.

Returning to FIG. 1, the primary cache hit determination circuit 105 is a circuit for checking whether an address related to a read request from the CPU 101 exists in the primary tag RAM 102a or not. When the address exists in the primary tag RAM 102a, the primary cache hit determination circuit 105 makes a cache hit signal related to the way active. The primary cache hit determination circuit 105 accesses an entry in which a parity error occurs because of the tag parity error detection circuit 103 and an entry on an (error) way WAY held in the tag parity error log register 104, the primary cache hit determination circuit 105 suppresses the cache hit signal from being output. When cache hit of a way $WAY_n$ is represented by $HIT_n$, the cache hit signal is expressed by the following theoretical equation:

$$HIT_n = (READ \cdot ADR\_MATCH_n \cdot (MCI\_C_n + MCI\_M_n) + WRITE \cdot ADR\_MATCH_n \cdot MCI\_M_n) \cdot \#PE\_WAY_n \#(ADR\_PE_n + MCI\_PE_n)$$

where "#" represents negation and the other symbols have meaning as follows.

READ: cache read
WRITE: cache write
ADR_MATCH: address of $WAY_n$ is matched
$MCI\_C_n$: status STATUS (see FIG. 2A) of entry of $WAY_n$ is C
$MCI\_M_n$: status STATUS (see FIG. 2A) of entry of $WAY_n$ is M
$ADR\_PE_n$: address ADR (see FIG. 2A) of entry of $WAY_n$ is parity error
$MCI\_PE_n$: status STATUS (see FIG. 2A) of entry of $WAY_n$ is parity error
$PE\_WAY_n$: number of way WAY (error) held in tag parity error log register 104
n=0, 1, 2, 3

A replace way selection circuit 106 is a circuit in which, when a new address, data, or the like are written in the entry of a way of the primary cache memory 102 shown in FIG. 9, the corresponding way (called a replace way) is selected. In the replace way selection circuit 106, a random method for selecting a replace way from a plurality of ways at random is employed. In the replace way selection circuit 106, a known LRU (Least Recently Used) algorithm is used as another selection method, so that the way of the entry which is accessed at the oldest time may be selected as the replace way.

When a plurality of ways include unused ways (empty ways), the replace way selection circuit 106 selects a replace way of the empty ways. When the plurality of ways do not include empty ways, the replace way selection circuit 106 selects a replace way from the plurality of ways at random by the random method. Further, the replace way selection circuit 106 is designed to select a replace way from ways other than a way (called an error way) of an entry in which a parity error occurs.

Figure 3:
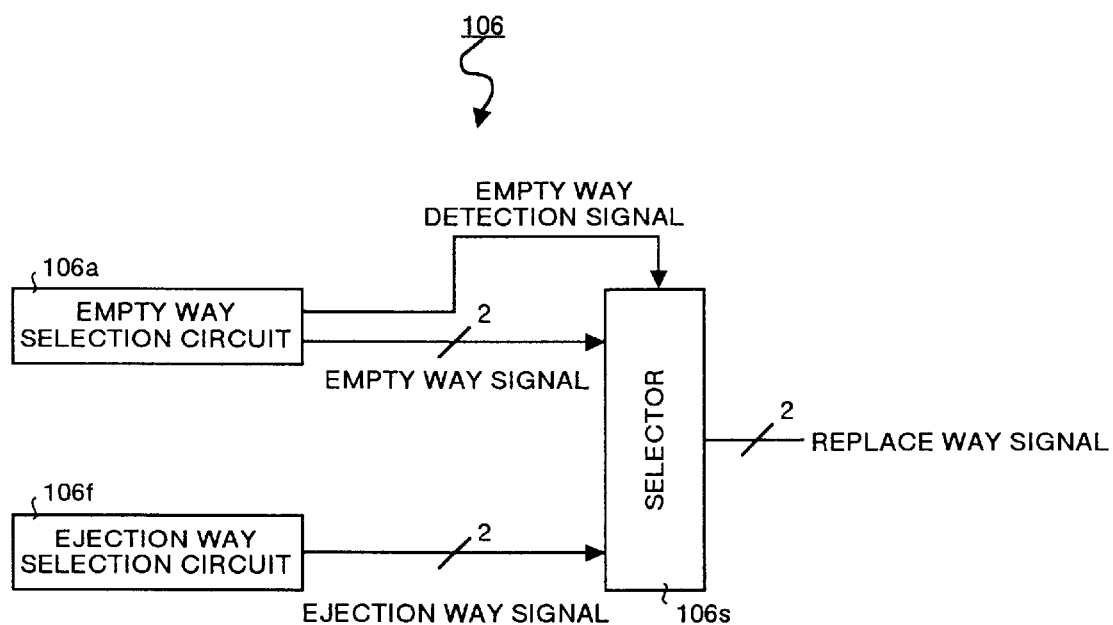
FIG. 3 is a block diagram showing the configuration of a replace way selection circuit 106 shown in FIG. 1.

FIG. 3 is a block diagram showing a detailed configuration of the replace way selection circuit 106. In FIG. 3, an empty way selection circuit 106a detects empty ways from a plurality of ways in the primary cache memory 102 and selects one of the empty ways. When the empty way selection circuit 106a detects the empty way it outputs an empty way detection signal and outputs the number of the selected empty way as an empty way signal.

Figure 4:
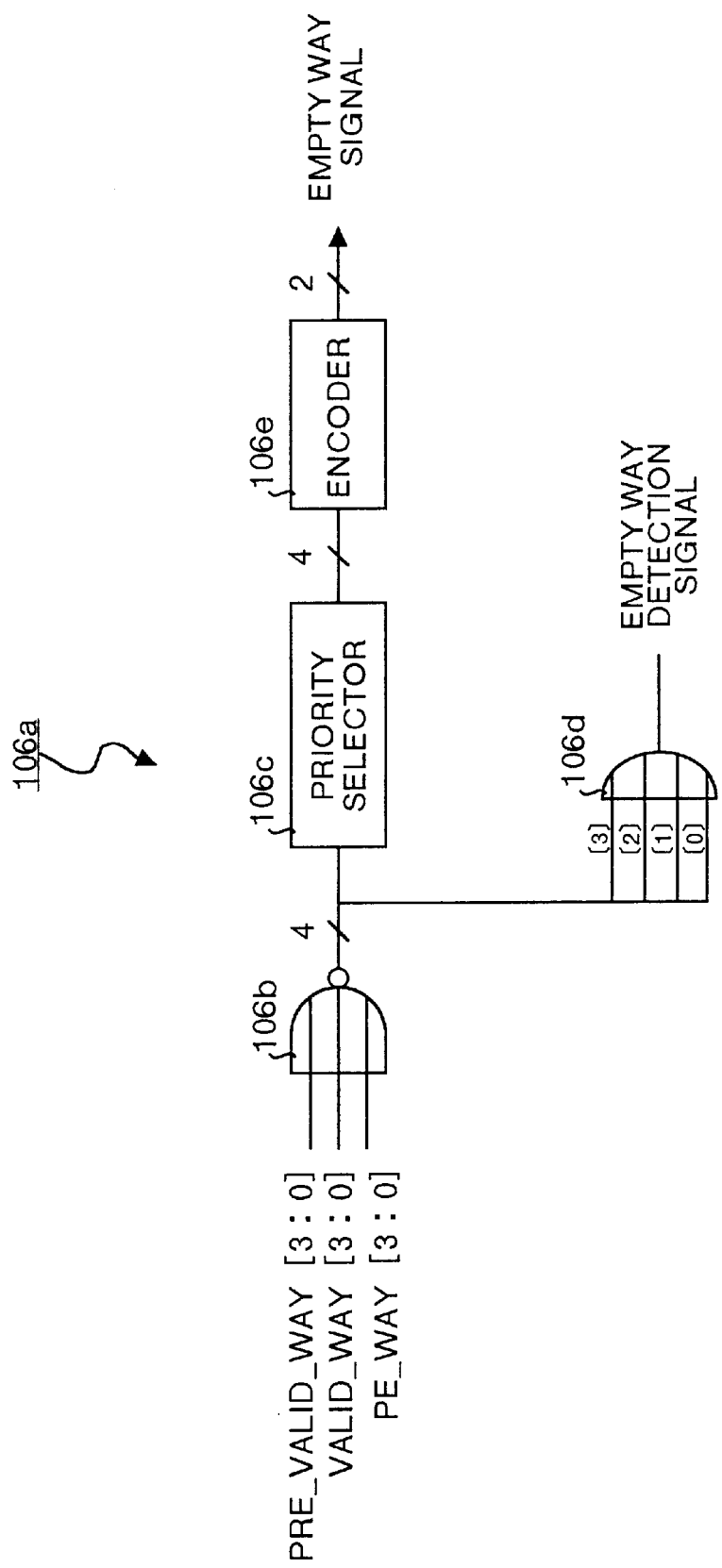
FIG. 4 is a block diagram showing the configuration of an empty way selection circuit 106a shown in FIG. 3.

FIG. 4 is a block diagram showing a detailed configuration of the empty way selection circuit 106a. The empty way selection circuit 106a shown in FIG. 4 is constituted by a NOR circuit 106b, a priority selector 106c, an OR circuit 106d, and an encoder 106e. To the NOR circuit 106b, a PRE_VALID_WAY signal, a VALID_WAY signal, and a PE_WAY signal each having a 4-bit configuration are input. The PRE_VALID_WAY signal is a signal representing the number of the way access of which is pending in the primary cache memory 102. The VALID_WAY signal is a signal representing the number of the way including an entry in which data being valid in the primary cache memory 102 is held. The PE_WAY signal is a signal representing the number of an error way in the primary cache memory 102. In each of the PRE_VALID_WAY signal, the VALID_WAY signal, and the PE_WAY signal, a bit, corresponding to the way number, of the four bits is "1".

The priority selector 106c, as shown in FIG. 5, outputs an output signal OUTPUT the most significant bit of which is "1" of bits of "1" in an input signal INPUT from the NOR circuit 106b, so that one replace way is selected from empty ways. Returning to FIG. 4, the OR circuit 106d calculates OR of the input signal INPUT.(see FIG. 5) from the NOR circuit 106b, so that an empty way detection signal is output. The encoder 106e converts the output signal OUTPUT (see FIG. 5) from the priority selector 106c into a 2-bit empty way signal. The empty way signal represents the number of the selected empty way.

Figure 6:
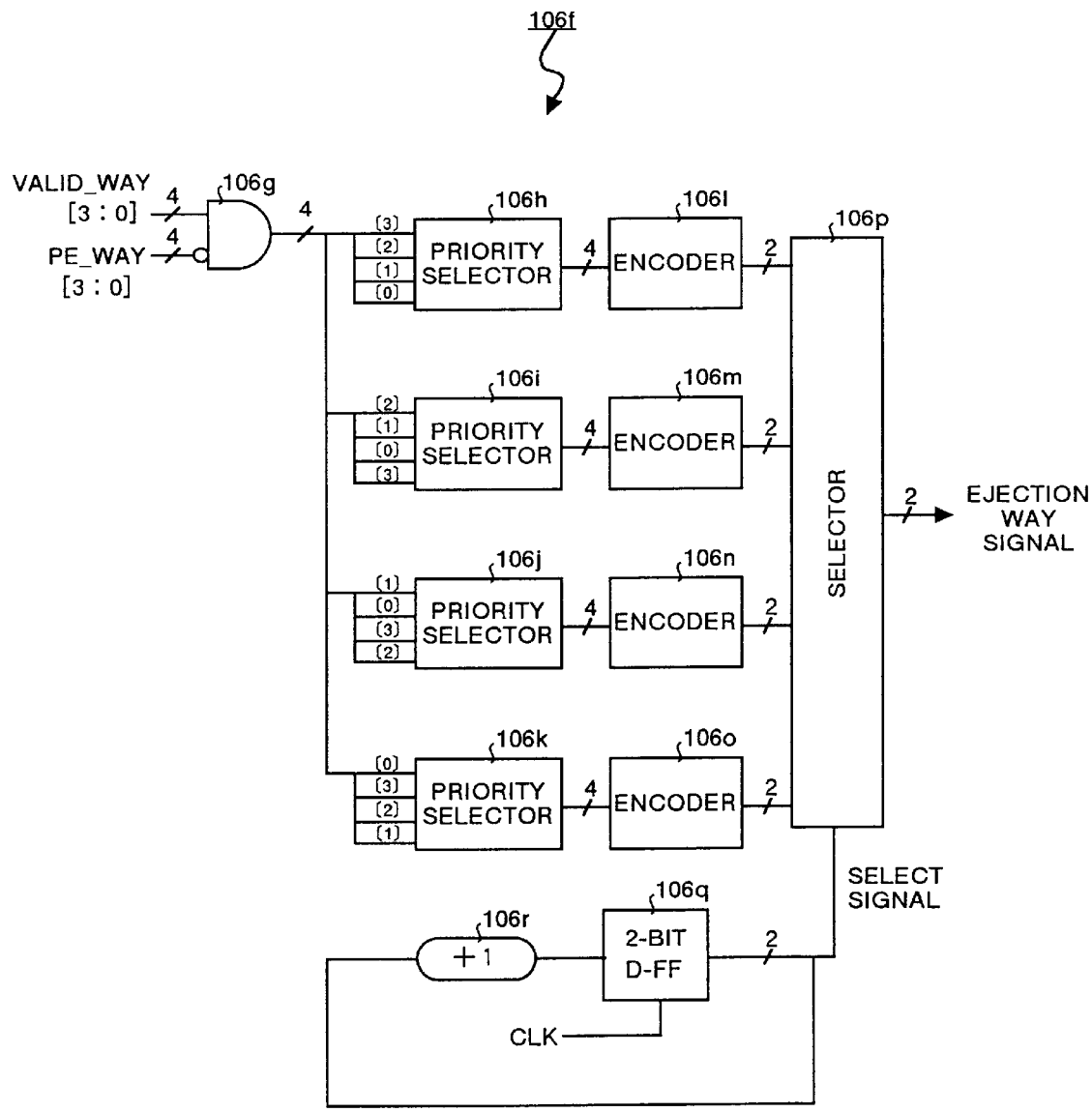
FIG. 6 is a block diagram showing the configuration of an ejection way selection circuit 106f shown in FIG. 3.

Returning to FIG. 3, an ejection way selection circuit 106f is a circuit for selecting one way as an ejection way from a plurality of ways when all the ways in the primary cache memory 102 are in use. FIG. 6 is a block diagram showing a detailed configuration of the ejection way selection circuit 106f. As shown in FIG. 6, to an AND circuit 106g, signals obtained by inverting the VALID_WAY signal and the PE_WAY signal each having a 4-bit configuration are input. Output signal from the AND circuit 106g is a signal representing the number of a way which can be ejected. Priority selectors 106h to 106k select one way from ways which can be ejected according to the order of bit priority shown in FIG. 7. For example, the priority selector 106h outputs a signal in which only one bit is made active according to the order of priority, i.e., the third bit, the second bit, the first bit, and the 0th bit, from output signals (4 bits) from the AND circuit 106g.

In the priority selectors 106h to 106k, as shown in FIG. 7, the order of bit priority is set such that the numbers of the bits which are made active in the same order of priority do not overlap. Four types of signals are generated in the priority selectors 106h to 106k. In the four types of signals, an active bit corresponds to the number of an ejection way. Returning to FIG. 6, encoders 106l to 106o convert output signals from the priority selectors 106h to 106k into 2-bit ejection way signals. The ejection way signal represents the number of an ejection way.

A selector 106p selects one of ejection way signals from the encoders 106l to 106o at random on the basis of a 2-bit selector signal and outputs the selected ejection way signal. A 2-bit D-FF 106q and an adder 106r constitute a circuit for generating the select signal. In this circuit, a 2-bit select signal incremented by one by the adder 106r is input to the 2-bit D-FF 106q at the leading edge of a clock signal CLK, and held data is output as a select signal. Therefore, a select signal incremented by one each time the clock signal rises is input to the selector 106p. The selector 106p selects an ejection way signal corresponding to the select signal from the ejection way signals from the encoders 106l to 106o each time the select signal is incremented by one.

Returning to FIG. 3, a selector 106s selects one empty way signal out of the empty way signals output by the empty way selection circuit 106a and the ejection way signals from the ejection way selection circuit 106f on the basis of the following conditions, and outputs the selected signal as a replace way signal. The conditions are:

(1) When an empty way detection signal is input by the empty way selection circuit 106a, an empty way signal is selected.

(2) When an empty way detection signal is not input by the empty way selection circuit 106a, an ejection way signal is selected.

Returning to FIG. 1, when cache miss is determined in the primary cache hit determination circuit 105, a secondary cache access control circuit 107 performs control to access the secondary cache memory 110 on the basis of the replace way signal from the replace way selection circuit 106, an address to be accessed, and the like. The secondary cache memory 110 stores part of data stored in the main memory device 112, and is a memory using the direct mapping method explained in FIG. 9. The secondary cache memory 110 has and having a capacity of 16k entries×64 kbytes. The secondary cache memory 110 is constituted by a secondary tag RAM 110a and a secondary data RAM 110b in the same manner as the secondary cache memory 14 (see FIG. 21). Tag information shown in FIG. 2F is held in the secondary tag RAM 110a.

In FIG. 2F, a status STATUS is information representing the status of data held in the secondary data RAM 110b, and is one of M (Modified), O (Owned), E (Exclusive), S (Shared), and I (Invalid) shown in FIG. 2G. Status M denotes a status in which another CPU (not shown) does not hold the data in the secondary data RAM 110b and that the data is updated one. Status O denotes a status in which another CPU holds the data in the secondary data RAM 110b and that the data is updated one. Status E denotes a status in which another CPU does not hold the data in the secondary data RAM 110b and that the data is not updated one. Status S denotes a status in which another CPU holds data in the secondary data RAM 110b. Status I denotes a status in which the data is invalid one.

An INCL bit is a bit representing whether data held in the secondary data RAM 110b exists in the primary data RAM 102b of the primary cache memory 102 or not. The INCL bit is set to be "1" when the data exists, and the INCL bit is set to be "0" when the data does not exist. A way WAY represents the number of a way of the primary data RAM 102b when data held in the secondary data RAM 110b is held in the way. An address ADR represents data held in the secondary data RAM 110b. A parity bit AP is an odd-number parity bit added to the address ADR. FIG. 9 typically shows the secondary cache memory 110 described above. As shown in FIG. 9, in the secondary tag RAM 110a, addresses A, B, and D (corresponding to the address ADR in FIG. 2F) of data a', b', and d' or the like, the INCL bit, the way WAY, and the like are held. In FIG. 9, information other than the status STATUS of the tag information shown in FIG. 2F is shown.

Returning to FIG. 1, the secondary cache control register 108 is a register in which an instruction (INDEX value) for normally recovering the primary cache memory 102 in which a parity error occurs is set according to the content of the secondary data RAM 110b. In the secondary cache control register 108, an INDEX value shown in FIG. 2D is set. The INDEX value is a value for designating an address in the secondary cache memory 110. When the secondary cache memory 110 is accessed (snooped) by the secondary cache access control circuit 107, by the secondary cache control register 108, and another CPU, an arbitration circuit 109 performs access arbitration to give an access right to one of the secondary cache access control circuit 107, the secondary cache control register 108, and the CPU. A secondary cache hit determination circuit 111 is a circuit for checking whether an address related to a read request from the CPU 101 exists in the secondary data RAM 110b. When the address exists in the secondary data RAM 110b, the secondary cache hit determination circuit 111 makes a cache hit signal related to the way active.

The main memory device 112 is a DRAM memory, a hard disk drive or the like for storing all data used in the CPU 101. A primary cache access control circuit 113 is a circuit for performing control to access the primary cache memory 102. A primary cache control register 114 is a register in which an instruction (way WAY and INDEX value) for normally recovering the primary cache memory 102 in which a parity error occurs is set. In the primary cache control register 114, a way WAY and an INDEX value shown in FIG. 2E are set. The way WAY represents the number of the way in the primary cache memory 102, and the INDEX value is a value for designating the address in the primary tag RAM 102a.

The operation of the first embodiment will be explained here with reference to the flow chart shown in FIG. 8, and FIG. 9 to FIG. 14. In this case, in the primary tag RAM 102a shown in FIG. 9, addresses A to D are held in the addresses of ways 0 to 3, respectively. Data a to d are held in the primary data RAM 102b to correspond to address A to D, respectively. In FIG. 9, the addresses A, B, and D, data a', b', and d' (all of which are old data), INCL bit="1", "1", and "1", and way WAY="0", "1", and "3" are held in the secondary cache memory 110.

When the CPU 101 outputs a read request for requesting that data e of an address E shown in FIG. 9 should be read, access (p1 in FIG. 9) to an entry of the primary tag RAM 102a is started in step SB1. In the next step SB2, it is checked whether a parity error is detected by the tag parity error detection circuit 103. In this case, if it is determined that a parity error has occurred at the address D in way 3 of the primary tag RAM 102a shown in FIG. 9 (p2 in FIG. 9), the check result in step SB2 shall be "Yes", and an interrupt routine for canceling the parity error is started (p3 in FIG. 9). If no parity error is detected, the check result in step SB2 shall be "No". In step SB3, as in the conventional cache memory apparatus described above, a normal process in which data is read from the primary cache memory 102, the secondary cache memory 110, or the main memory device 112 is performed.

When the check result in step SB2 becomes "Yes", the mode changes from the normal operation mode to a parity error mode, the processes in steps SB4 to SB8 and the processes in step SB9 to SB12 are performed in parallel to each other. More specifically, in step SB4, the CPU 101 is requested to perform a synchronous trap in synchronism with the change to the parity error mode. In step SB9, the numbers of the address D (0101) in which the parity error shown in FIG. 9 has occurred and the number of error way 3 are written in the tag parity error log register 104.

In this manner, in the next step SB10, the primary cache hit determination circuit 105 performs control for determining all accesses to entries in which parity errors occur as cache miss. Instep SB11, the primary cache hit determination circuit 105 determines all accesses to the error way 3 as cache miss. In the next step SB12, the replace way selection circuit 106 excludes the error way 3 from ways to be replaced, so that the error way 3 is prohibited from being replaced (p4 in FIG. 10). In the next step SB13, it is checked whether the tag parity error log register 104 is cleared or not. If the check result is "No", the CPU shifts the process to step SB11.

Figure 10:
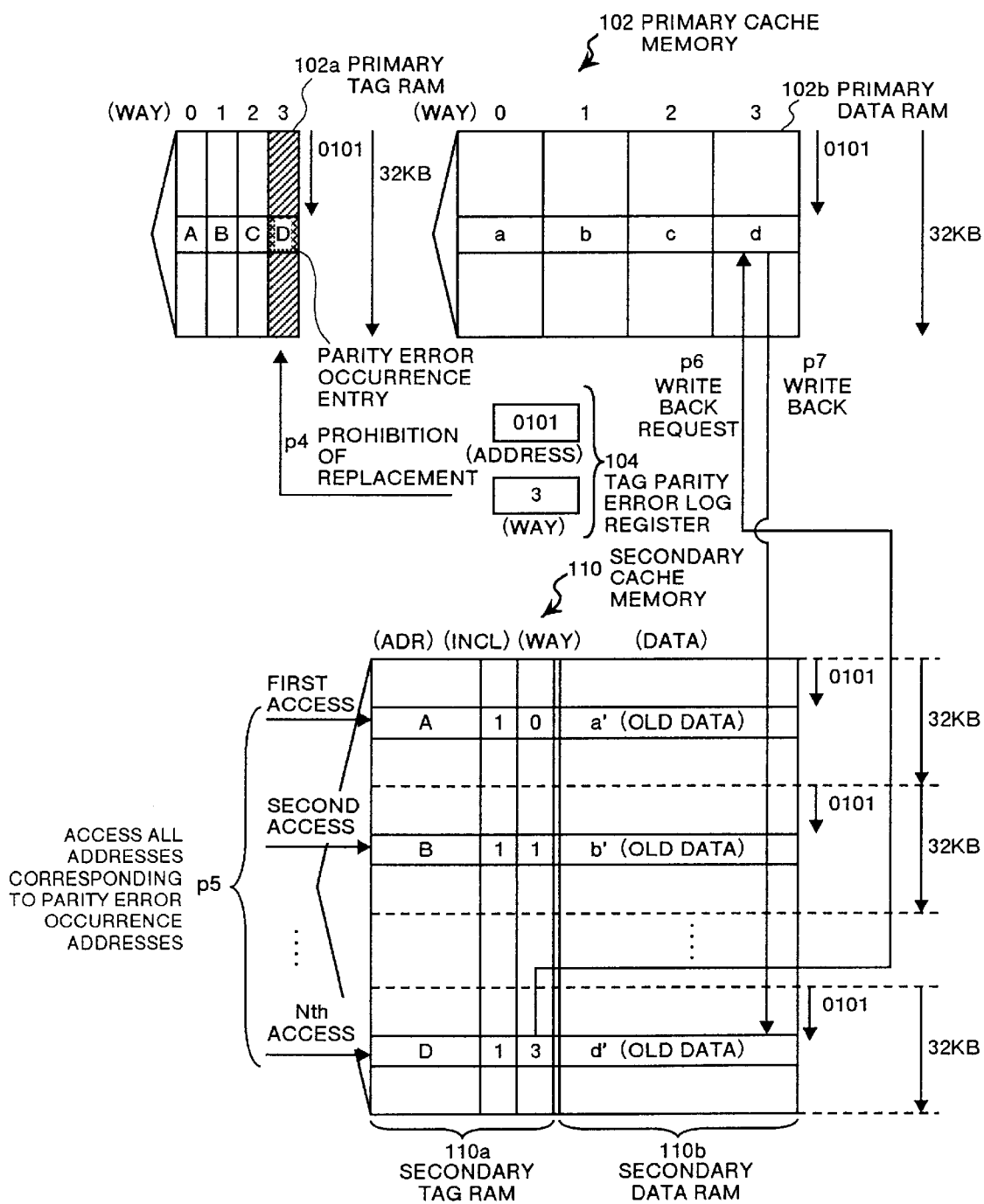
FIG. 10 is a diagram for explaining a recovery process in the first embodiment.

On the other hand, in step SB5, the CPU 101 reads the address D (0101) at which a parity error occurs and the number of the error way 3 are read from the tag parity error log register 104 shown in FIG. 10, and then shifts the process to step SB6. In step SB6, on the basis of the address D (0101) read in step SB5, the CPU 101 calculates the addresses of entries of the secondary cache memory 110 which may use the entry in which the parity error occurs as an INDEX value (instruction). The CPU 101 sequentially sets the addresses in the secondary cache control register 108.

In this manner, in the secondary cache memory 110 shown in FIG. 10, the entry of the address A is accessed for the first time (p5 in FIG. 10). In this case, since the way WAY is "0", and is different from the error way 3, this entry is excluded. Similarly, the entry of the address B is accessed for the second time. However, this entry has a way WAY of "1" which is different from the error way 3, therefore it is excluded. When the entry of the address D is accessed for the nth time, the way WAY "3" of this entry is equal to the error way 3, and the INCL bit is "1". The following process is then performed according to the entry. More specifically, it is requested that data d held in the entry of the error way 3 of the primary data RAM 102b show in FIG. 10 should be written back to the secondary data RAM 110b (p6 in FIG. 10).

The data d held in the entry of the way 3 in the primary data RAM 102b shown in FIG. 10 is written back (p7 in FIG. 10) to the entry corresponding to the address D in the secondary cache memory 110. More specifically, in this case, the data d' (old data) held in the entry corresponding to the address D in the secondary cache memory 110 is updated to the data d (latest data). Therefore, the address D and the data d held in the primary cache memory 102 before the parity error occurs are held in the secondary cache memory 110 (see FIG. 11).

Figure 11:
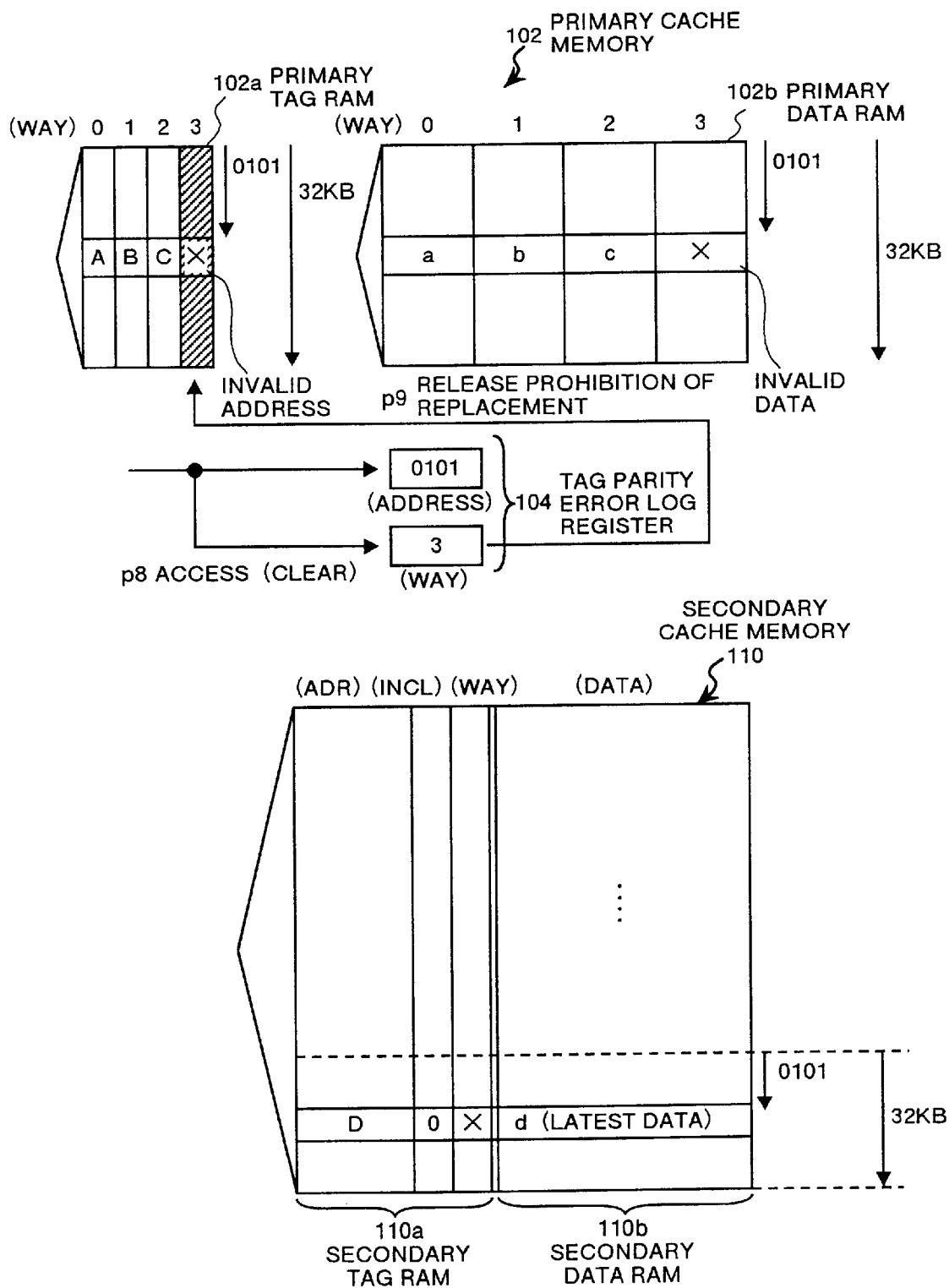
FIG. 11 is a diagram for explaining a completion process of an interrupt routine in the first embodiment.

Upon completion of the write back operation, in the secondary tag RAM 110a, the INCL bit corresponding to the address D is set to be "0" (see FIG. 11). In this manner, the address D and the data d held in the secondary cache memory 110 are not also held in the entries of any ways of the primary cache memory 102.

In step SB7, the CPU 101 sets "3" as the way WAY shown in FIG. 2E and sets a value representing the address of the entry as the INDEX value in the primary cache control register 114. The way WAY 3 is an error way in the primary cache memory 102 shown in FIG. 10, and the INDEX value is a value representing the address of the entry in which the data d is held. In the primary tag RAM 102a, the status STATUS show in FIG. 2A is set to be "1" (invalid). In this manner, an address held in the entry marked by "x" in the primary tag RAM 102a shown in FIG. 11 is set as an invalid address, and data held in the entry marked by "x" in the primary data RAM 102b is set as invalid data. Therefore, the entry marked by "x" is in an unused state.

In the next step SB8, the tag parity error log register 104 is cleared by access performed by the CPU 101 (p8 in FIG. 11). In this manner, in the primary cache hit determination circuit 105, control for determining access to the error way 3 in the primary cache memory 102 and an entry in which a parity error occurs as cache miss is released. In the replace way selection circuit 106, prohibition of replace of the error way 3 in the primary cache memory 102 is released (p9 in FIG. 11). When the tag parity error log register 104 is cleared, the check result in step SB13 becomes "Yes". The series of interrupt routines are completed, and the normal operation is performed.

In the normal operation, an operation performed when the CPU 101 accesses the address D shown in FIG. 12 will be described below with reference to the flow chart shown in FIG. 20. In step SA1 shown in FIG. 20, the CPU 101 outputs a read request which requests that the data d of the address D shown in FIG. 12 should be read (p10 in FIG. 12). In this case, in the step SA2, the primary cache hit determination circuit 105 accesses the primary cache memory 102 and compares the address D with the address held in the primary tag RAM 102a shown in FIG. 12.

In step SA3, the primary cache hit determination circuit 105 checks whether the address D exists in the primary tag RAM 102a or not, i.e., whether cache hit is established or not. In this case, since the address D does not exist in the primary tag RAM 102a, the primary cache hit determination circuit 105 determines this state as cache miss (p11 in FIG. 12), and sets the check result in step SA3 as "No".

Figure 12:
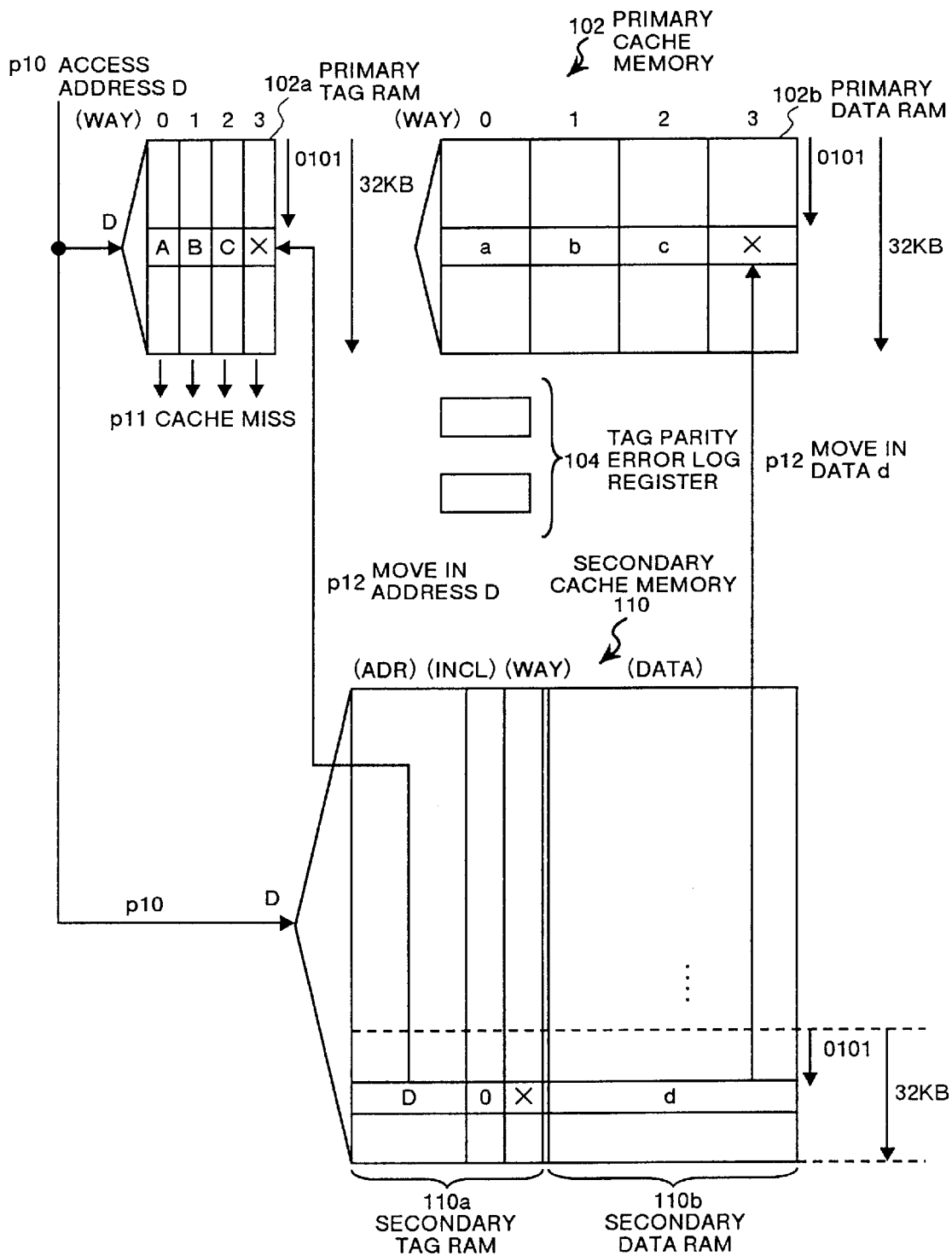
FIG. 12 is a diagram for explaining an operation after the operation returns to a normal operation in the first embodiment.

In step SA5, the secondary cache memory 110 is accessed (p10 in FIG. 12). In step SA6, it is checked whether the secondary tag RAM 110a has an INCL bit set "1" or not. If the secondary tag RAM 110a has an INCL bit of "1", the write back operation described above is performed in step SA7. In the next step SA8, the secondary cache hit determination circuit 111 checks whether the address D exists in the secondary tag RAM 110a or not, i.e., whether cache hit is established or not. In this case, since the address D exists in the secondary tag RAM 110a, the secondary cache hit determination circuit 111 sets the check result in step SA8 as "Yes". In the next step SA9, the data d corresponding to the address D is read from the secondary data RAM 110b. The read data d and the address D are moved from the secondary cache memory 110 into the primary cache memory 102 (p12 in FIG. 12).

This operation is performed for the following reason. That is, when there is data which exists in the secondary cache memory 110 and does not exist in the primary cache memory 102, the data is moved from the secondary cache memory 110 into the primary cache memory 102 to shorten the access time for the data for the next time. In this case, the address D is moved in the entry of the error way 3 in the primary tag RAM 102a shown in FIG. 12, and the data d is moved in the entry of the way 3 in the primary data RAM 102b. In this manner, the status of the primary cache memory 102 is returned to the status before the parity error in the way 3 occurs.

Figure 13:
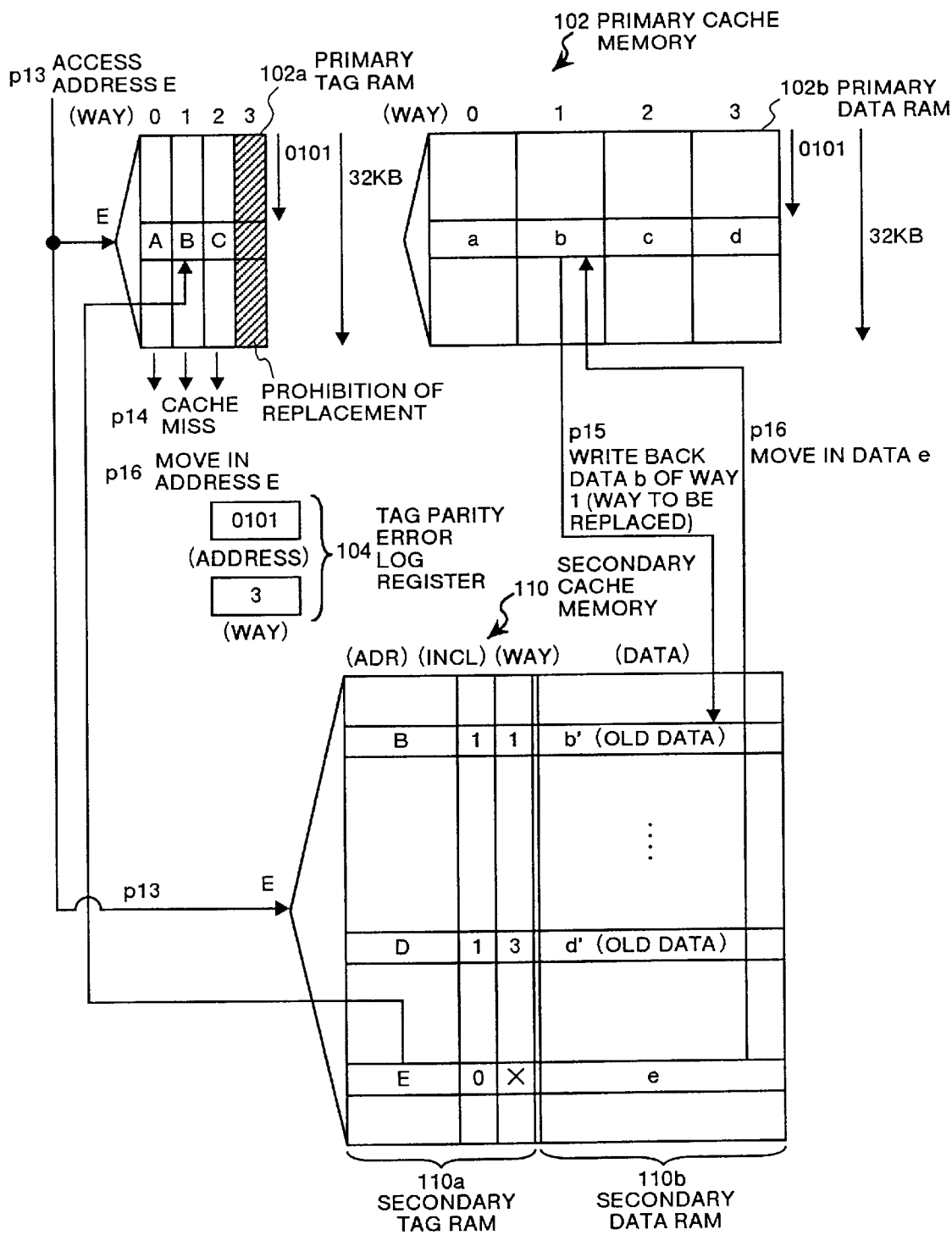
FIG. 13 is a diagram for explaining an operation in the first embodiment when a parity error occurs.

Here, an operation performed when access is performed in a period from when the recovery process shown in FIG. 10 is started to when the interrupt routine shown in FIG. 11 is completed after the parity error occurs in the primary cache memory 102 will be described below with reference to FIG. 13, FIG. 14, and FIG. 20. FIG. 13 explains a case in which normal access is performed although the address E is accessed after a parity error occurs. Similarly, FIG. 14 explains a case in which a normal access is performed although the address D is accessed after a parity error occurs.

First, the case in which the address E is accessed will be described below with reference to FIG. 13 and FIG. 20. In step SA1 shown in FIG. 20, the CPU 101 outputs a read request which requests that the data e of the address E shown in FIG. 13 should be read (p13 in FIG. 13). In this case, in the step SA2, the primary cache hit determination circuit 105 accesses the primary cache memory 102 and compares the address E with the address held in the primary tag RAM 102a shown in FIG. 13.

In step SA3, the primary cache hit determination circuit 105 checks whether the address E exists in the primary tag RAM 102a or not, i.e., whether cache hit is established or not. In this case, since the address E does not exist in the primary tag RAM 102a, the primary cache hit determination circuit 105 determines this state as cache miss (p14 in FIG. 13), and sets the check result in step SA3 as "No".

In step SA5, the secondary cache memory 110 is accessed (p13 in FIG. 13). In step SA6, it is checked whether the secondary tag RAM 110a has an INCL bit set "1" or not. If the check result is "Yes", it is considered that, for example, a way 1 in the primary cache memory 102 is selected as a replace way in the replace way selection circuit 106. In this case, attention must be given to the following. That is, since the way 3 is set as a replace prohibition way in the primary cache memory 102, one way is selected as a replace way from three ways, i.e., ways 0 to 2 other than the way 3 in the replace way selection circuit 106. Since the INCL bit of an address B in the secondary cache memory 110 is "1", data b' (old data) of the address B is written back in step SA7 (p15 in FIG. 13).

More specifically, in step SA7, with reference to the address B existing in the way 1 of the primary tag RAM 102a, the data b (latest data) existing in the primary data RAM 102b is written back to the region corresponding to the address B in the secondary data RAM 110b (p15 in FIG. 13). In this manner, the data b' (old data) of the address B in the secondary data RAM 110b is updated into the data b (latest data).

In the next step SA8, the secondary cache hit determination circuit 111 checks whether the address E exists in the secondary tag RAM 110a or not, i.e., whether cache hit is established or not. In this case, since the address E exists in the secondary tag RAM 110a, the secondary cache hit determination circuit 111 sets the check result in step SA8 as "Yes". In the next step SA9, the data e corresponding to the address E is read from the secondary data RAM 110b. The read data e and the address E are moved from the secondary cache memory 110 into the primary cache memory 102 (p16 in FIG. 13). In this case, the address E is moved in the entry of the way 1 in the primary tag RAM 102a shown in FIG. 13, and the data e is moved in the entry of the way 2 in the primary data RAM 102b. In this manner, in the first embodiment, even if a parity error occurs with respect to the way 3 in the primary cache memory 102, access to the address E is not adversely affected in any way.

A case in which the address D is accessed will be described below with reference to FIG. 14 and FIG. 20. In step SA1 shown in FIG. 20, the CPU 101 outputs a read request which requests that the data d of the address D shown in FIG. 14 should be read (p17 in FIG. 14). In this case, in the step SA2, the primary cache hit determination circuit 105 compares the address D with the address held in the primary tag RAM 102a shown in FIG. 14. In the next step SA3, the primary cache hit determination circuit 105 checks whether the address D exists in the primary tag RAM 102a or not, i.e., whether cache hit is established or not. In this case, since the address D does not exist in the primary tag RAM 102a, the primary cache hit determination circuit 105 determines this state as cache miss (p18 in FIG. 14), and sets the check result in step SA3 as "No".

Figure 14:
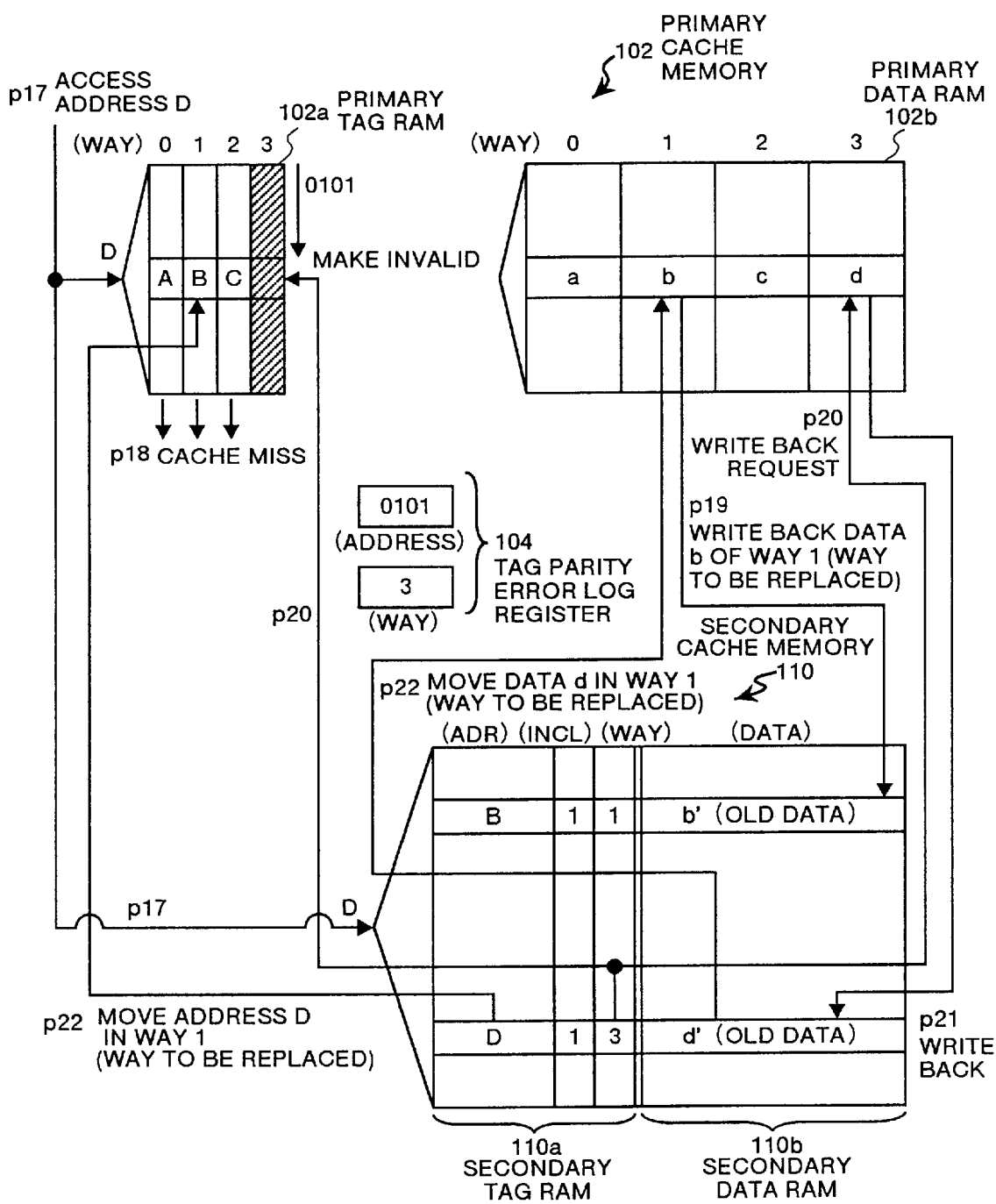
FIG. 14 is a diagram for explaining an operation in the first embodiment when a parity error occurs.

In step SA5, the secondary cache memory 110 is accessed (p17 in FIG. 14). In step SA6, it is checked whether the secondary tag RAM 110a has an INCL bit set "1" or not. In this case, in the replace way selection circuit 106, as in the case shown in FIG. 13, it is considered that, as a replace way, a way 1 in the primary cache memory 102 is selected as a way to be replaced from ways 0 to 2. Since the INCL bit of an address B in the secondary cache memory 110 is "1", data b' (old data) of the address B is written back in step SA7 (p19 in FIG. 14).

More specifically, in step SA7, with reference to the address B existing in the way 1 of the primary tag RAM 102a, the data b (latest data) existing in the primary data RAM 102b is written back to the region corresponding to the address B in the secondary data RAM 110b (p19 in FIG. 14). In this manner, the data b' (old data) of the address B in the secondary data RAM 110b is updated into the data b (latest data).

In the next step SA8, the secondary cache hit determination circuit 111 checks whether the address D exists in the secondary tag RAM 110a or not, i.e., whether cache hit is established or not. In this case, since the address D exists in the secondary tag RAM 110a, the secondary cache hit determination circuit 111 sets the check result in step SA8 as "Yes". In the next step SA9, since the way WAY of the entry of the address D in the secondary cache memory 110 is "3", and the INCL bit is "1", the following process is performed to the entry. That is, it is requested that the data d held in the entry of the way 3 of the primary data RAM 102b should be written back to the secondary data RAM 110b (p20 in FIG. 14).

The data d held in the entry of the way 3 in the primary data RAM 102b shown in FIG. 14 is written back to the entry corresponding to the address D in the secondary cache memory 110 (p21 in FIG. 14). More specifically, in this case, the data d' (old data) held in the entry corresponding to the address D in the secondary cache memory 110 is updated into the data d (latest data). Therefore, the address D and the data d held in the primary cache memory 102 before the parity error occurs are held in the secondary cache memory 110. The data d corresponding to the address D is read from the secondary data RAM 110b.

The read data d and the address D of the data d are moved from the secondary cache memory 110 into the way 1 (way to be replaced) of the primary cache memory 102 (p22 in FIG. 14), and the way WAY related to the address D in the secondary cache memory 110 is changed from "3" to "1". In this case, the address D is moved in the entry of the way 1 in the primary tag RAM 102a shown in FIG. 14, and the data d is moved in the entry of the way 1 in the primary data RAM 102b. In this manner, in the first embodiment, even if a parity error occurs with respect to the way 3 in the primary cache memory 102, access to the address D is not adversely affected in any way.

As described above, according to the first embodiment described above, when a parity error occurs in the primary cache memory 102, the data corresponding this address is written back to the secondary cache memory 110, and the address and the data corresponding the secondary cache memory 110 are moved in the primary cache memory 102. Accordingly, even if a parity error occurs, the data corresponding the address can be normally read. Furthermore, since a way in which a parity error has occurred is prohibited from being replaced in the primary cache memory 102, the entry of such way is not accessed. Thus, even if a parity error occurs in the primary cache memory 102, system down can be avoided, and the reliability of the apparatus is greatly improved.

In the first embodiment described above, when a parity error occurs at the address D of the primary tag RAM 102a shown in FIG. 9, the mode is changed from the normal operation mode to the parity error mode, and the way 3 is prohibited from being replaced (see FIG. 10) to perform the recovery process. However, the recovery process may be performed by the method of a modification (to be described below) of the first embodiment. In the modification of the first embodiment, when the status of the entry of the address D in the primary tag RAM 102a, i.e., the status STATUS shown in FIG. 2A is I (invalid), the entry is recovered without changing the mode to the parity error mode.

Figure 15:
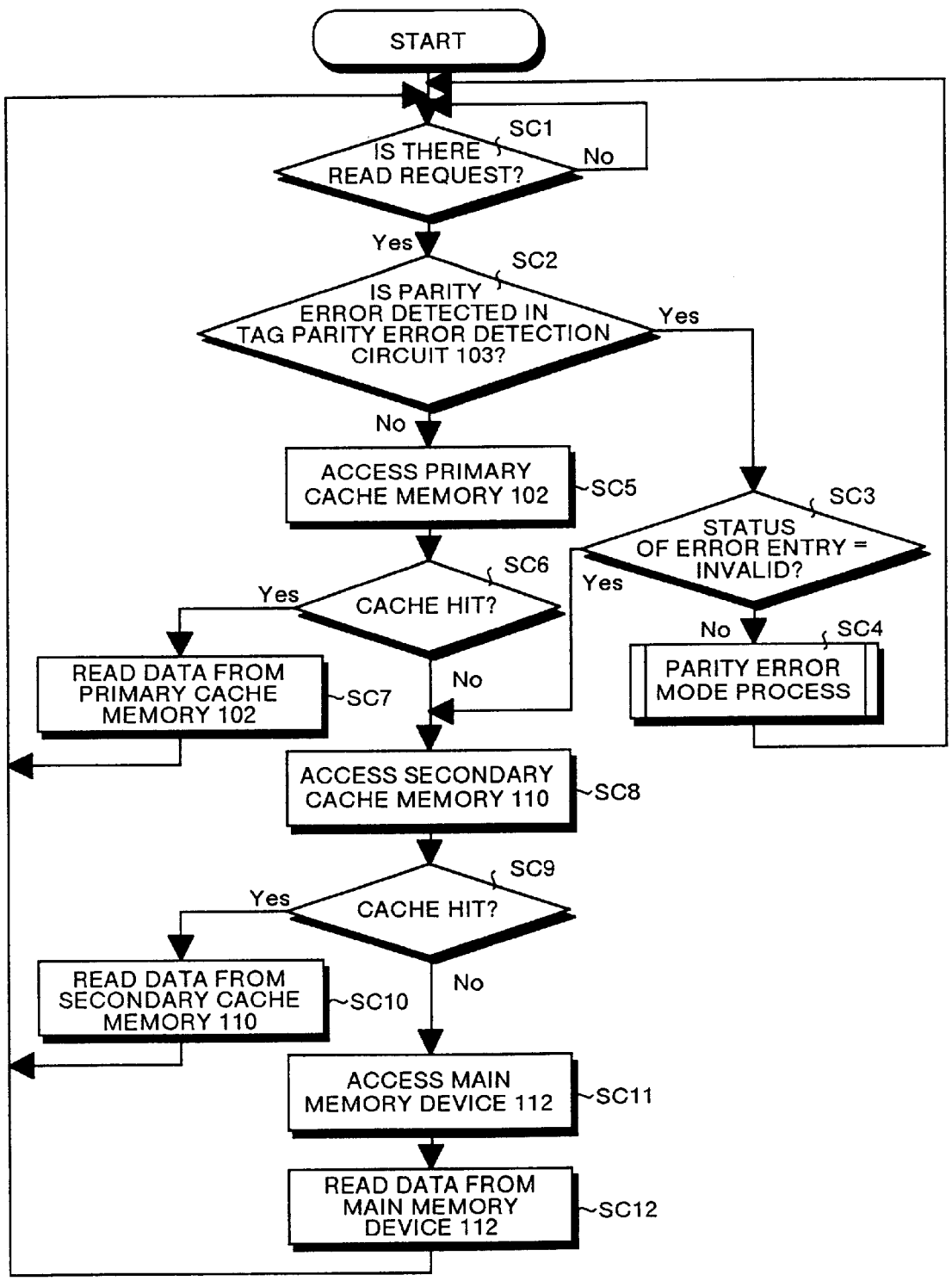
FIG. 15 is a flow chart for explaining the operation of a modification of the first embodiment.

FIG. 15 is a flow chart for explaining a main operation of the modification of the first embodiment. In step SC1 shown in FIG. 15, the CPU 101 outputs a read request. When such a read request is output, in the step SC2, the tag parity error detection circuit 103 checks whether a parity error in the primary tag RAM 102a is detected or not. In this case, it is assumed that a parity error is detected in the entry of the address D of the primary tag RAM 102a shown in FIG. 9, therefore the check result in step SC2 becomes "Yes". In the next step SC3, it is checked whether the status STATUS shown in FIG. 2A related to the entry in which the parity error has occurred is set to be I (invalid) or not. More specifically, in the primary cache memory 102 shown in FIG. 9, it is checked whether the entry of the primary tag RAM 102a corresponding to the address D is invalid or not. In this case, when the status STATUS is M or C, i.e., when the status STATUS is valid, the check result in step SC3 is set to be "No", a parity error mode process is executed in step SC4. This parity error mode process is the same as the processes in the steps SA4 to SB13 described above (see FIG. 8).

On the other hand, in the primary cache memory 102, when the status STATUS is I (invalid), the parity error occurring in the primary tag RAM 102a is regarded as cache miss, and the check result in step SC3 is set to be "Yes". In the next step SC8, the secondary cache memory 110 is accessed. In the subsequent step SC9, the secondary cache hit determination circuit 111 checks whether the address exists in the secondary tag RAM 110a or not, i.e., whether cache hit is established or not. When the check result is "Yes", in the next step SC10, the data corresponding to the address is read from the secondary cache memory 110 (secondary data RAM 110b). As in the operation described above, the address and the data are moved from the secondary cache memory 110 into the primary cache memory 102, e.g., the entry of the way 3, so that the status is returned to the status before the parity error occurs.

On the other hand, when the check result in step SC2 is "No", after the primary cache memory 102 is accessed in the next step SC5, it is checked in step SC6 whether the address exists in the primary tag RAM 102a or not, i.e., whether cache hit is established or not. When the check result is "No", the processes in the steps subsequent to the step SC8 described above are performed. When the check result in step SC6 is "Yes", the data corresponding to the address is read from the primary cache memory 102.

On the other hand, when the check result in step SC9 is "No", after the main memory device 112 is accessed in step SC11, the data corresponding the address is read from the main memory device 112 in step SC12.

As described above, according to the modification of the first embodiment described above, when a parity error occurs in the primary cache memory 102, and the entry in which the parity error has occurred is made invalid, this state is regarded as cache miss to set such a status that the way of the entry is permitted to be replaced. For this reason, the entry is recovered without changing the mode to the parity error mode.

Figure 8:
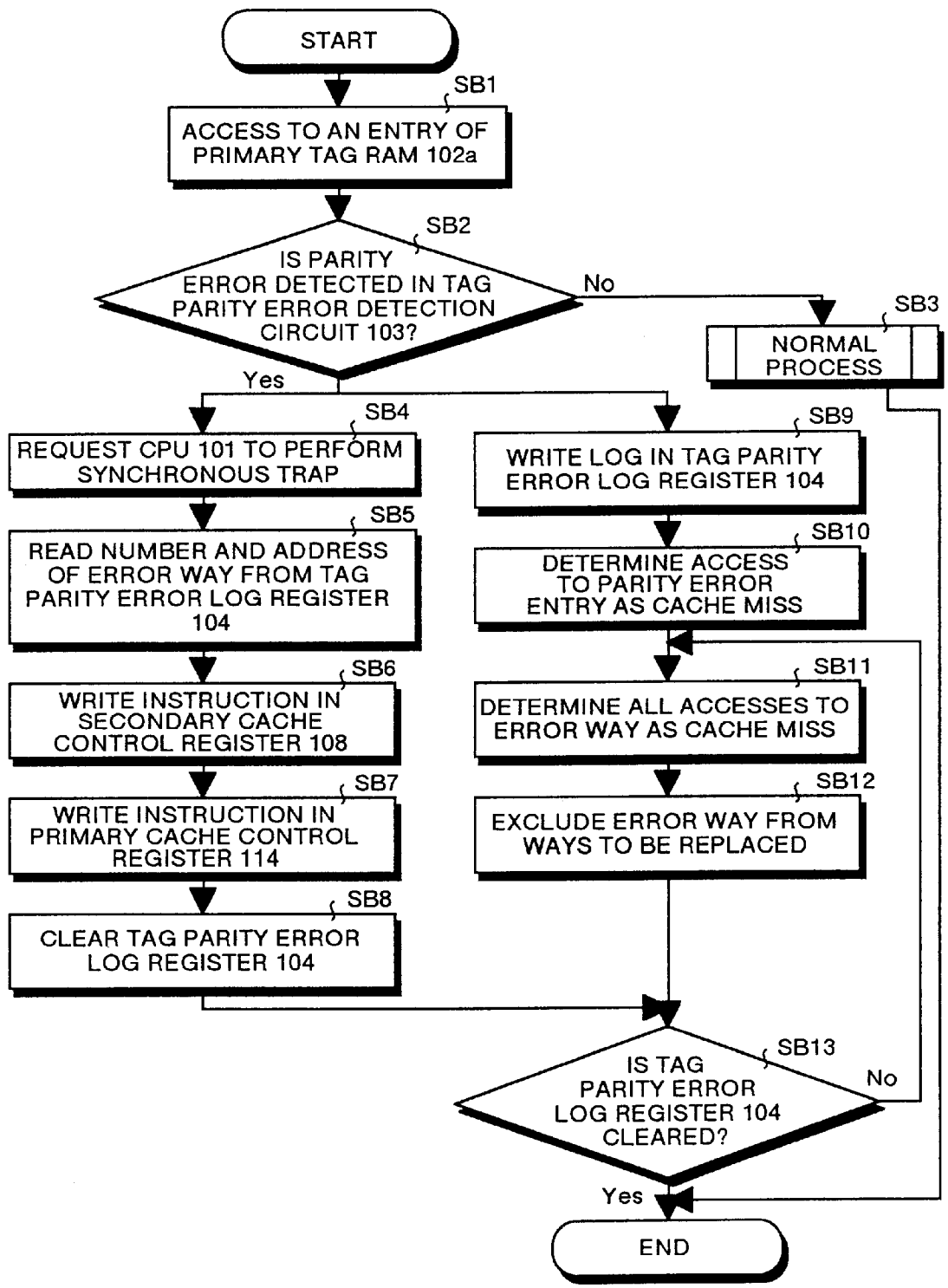
FIG. 8 is a flow chart for explaining the operation of the first embodiment.

In the first embodiment described above, a case is explained in which when it is determined in step SB2 shown in FIG. 8 that a parity error has occurred, in synchronism with this, the mode is changed into the parity error mode, and the recovery process is immediately performed. However, the recovery process may be performed in a synchronism with occurrence of the parity error. More specifically, if there is another access which is pending when a parity error has occurred, the recovery process is performed after the access is completed. Thus, the access is not adversely affected.

Further, in the first embodiment described above, a case is explained in which when a parity error occurs in the primary cache memory 102, a way including an entry in which a parity error has occurred is prohibited from being replaced. However, the entire way need not be prohibited from being replaced. Only the entry may be prohibited from being replaced. In this case, the functions of the primary cache hit determination circuit 105 and the replace way selection circuit 106 may be changed as described below. That is, the primary cache hit determination circuit 105 suppresses outputting of a cache hit signal related to only the entry in which the parity error occurs. In this case, when cache hit of a way WAY, is represented by HIT$_n$, the cache hit signal is expressed by the following theoretical equation:

$$HIT_n = (READ \cdot ADR\_MATCH_n \cdot (MCI\_C_n + MCI\_M_n) + WRITE \cdot ADR\_MATCH_n \cdot MCI\_M_n) \cdot \#(ADR\_PE_n + MCI\_PE_n)$$

where "#" represents negation and the other symbols have meanings as following.

READ: cache read
WRITE: cache write
ADR_MATCH: address of WAY$_n$ is matched
MCI_C$_n$: status STATUS (see FIG. 2A) of entry of WAY$_n$ is C
MCI_M$_n$: status STATUS (see FIG. 2A) of entry of WAY$_n$ is M
ADR_PE$_n$: address ADR (see FIG. 2A) of entry of WAY$_n$ is parity error
MCI_PE$_n$: status STATUS (see FIG. 2A) of entry of WAY$_n$ is parity error
n=0, 1, 2, 3

In the replace way selection circuit 106, in place of the PE_WAY signal (see FIG. 4 and FIG. 6) from the tag parity error log register 104, a parity error signal from the tag parity error detection circuit 103 is used, so that an object to be prohibited from being replaced is reduced to an entry. In this case, the object to be prohibited from being replaced after a parity error has occurred is reduced from a way to an entry, another entry which can be used in the way is not prohibited from being accessed.

Figure 16:
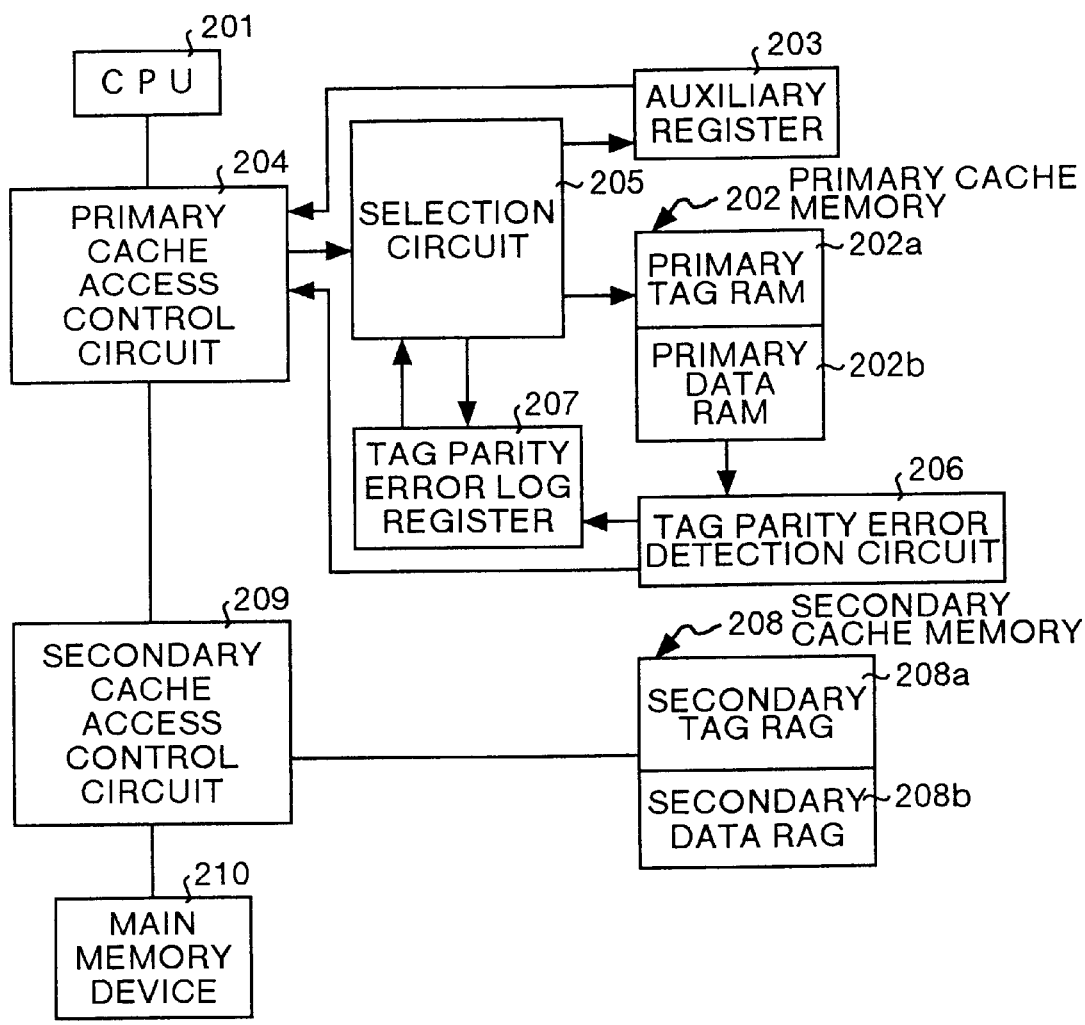
FIG. 16 is a block diagram showing the configuration of a second embodiment according to the present invention.

FIG. 16 is a block diagram showing the configuration of the second embodiment according to the present invention. The cache memory apparatus comprises a multiple cache memory (primary cache memory 202 and secondary cache memory 208) to eliminate a difference in the processing speed between a CPU 201 and a main memory device 210 in the same manner as in the first embodiment. The CPU 201 accesses the primary cache memory 202, the secondary cache memory 208, or the main memory device 210 to read/write data.

The CPU 201, the primary cache memory 202, the secondary cache memory 208, and the main memory device 210 correspond to the CPU 101, the primary cache memory 102, the secondary cache memory 110, and the main memory device 112 shown in FIG. 1. Although the primary cache memory 102 shown in FIG. 1 is a memory using a 4-way set associative method, the primary cache memory 202 shown in FIG. 16 is a memory using a direct mapping method. The primary cache memory 202 is constituted by a primary tag RAM 202a and a primary data RAM 202b. The primary tag RAM 202a has a capacity of 256 entries×64 bytes. Tag information shown in FIG. 2H is held in each entry. In FIG. 2H, the status STATUS is information representing the status of data held in the secondary data RAM 202b, and is one of M (Modified), C (Clean), and I (Invalid) shown in FIG. 2B.

The address ADR is the address of the data held in the primary data RAM 202b. A parity bit AP is an odd-number parity added to an address ADR, and is used by an odd-number parity check method to check whether a parity error occurs at the address ADR.

On the other hand, the secondary cache memory 208 stores part of data stored in the main memory device 210, and is a memory using the direct mapping method as in the primary cache memory 202 and having a capacity of 16-k entries×64 kbytes. The secondary cache memory 208 constituted by a secondary tag RAM 208a and a secondary data RAM 208b. Tag information shown in FIG. 2I is held in the secondary tag RAM 208a.

In FIG. 2I, an INCL bit is a bit representing whether data held in the secondary data RAM 208b exists in the primary data RAM 202b of the primary cache memory 202 or not. The INCL bit is set to be "1" when the data exists, and the INCL bit is set to be "0" when the data does not exist. A status STATUS is information representing the status of data held in the secondary data RAM 208b, and is one of M (Modified), O (Owned), E (Exclusive), S (Shared), and I (Invalid) shown in FIG. 2G. The address ADR represents the address of data held in the secondary data RAM 208b.

Returning to FIG. 16, an auxiliary register 203 is a register for holding data of one entry in the primary cache memory 202. When a parity error occurs in the primary cache memory 202, the auxiliary register 203 is used in place of the entry in which the parity error occurs. Tag information shown in FIG. 2H is held in the auxiliary register 203 as in the primary cache memory 202. In the auxiliary register 203, the status STATUS shown in FIG. 2H is set to be I.

A tag parity error detection circuit 206 is a circuit for detecting a parity error of the tag information in the primary tag RAM 202a. More specifically, the tag parity error detection circuit 206 detects a parity error of the address ADR by an odd-number parity check method using the parity bit AP shown in FIG. 2H. A tag parity error log register 207 is a register for holding information related to an error shown in FIG. 2J when a parity error is detected by the tag parity error detection circuit 206. In FIG. 2J, when the parity error occurs, "1" is set in a flag FLAG, and an index value INDEX represents the address of an entry in which a parity error occurs.

When the tag parity error detection circuit 206 detects a parity error, the tag parity error detection circuit 206 sets the flag FLAG to be "1", and sets the index value INDEX as an address. When a parity error occurs, the tag parity error detection circuit 206 outputs tag information in which the status STATUS related to the entry and shown in FIG. 2H is corrected into I to the primary cache access control circuit 204. This is because cache hit is prevented in access to an entry in which a parity error occurs.

The primary cache access control circuit 204 checks whether an address related to a read request from the CPU 201 exists in the primary tag RAM 202a or recognizes tag information input by the tag parity error detection circuit 206 when a parity error occurs to control access to the primary cache memory 202. The details of the operation of the primary cache access control circuit 204 will be described later. The selection circuit 205 performs switching control between the auxiliary register 203 and the primary cache memory 202. More specifically, the selection circuit 205 performs switching control from the primary cache memory 202 to the auxiliary register 203 when the flag FLAG shown in FIG. 2J in the tag parity error log register 207 is "1" and when the address of a read request from the CPU 201 is equal to the index value INDEX in FIG. 2J. The secondary cache access control circuit 209 performs access control to the secondary cache memory 208, control related to the write back operation, and the like. The details of the operation of the secondary cache access control circuit 209 will be described later.

The operation of the second embodiment will be explained here with reference to the flow chart shown in FIG. 17. When a parity error occurs in the entry of the primary cache memory 202 shown in FIG. 16, the parity error is detected by the tag parity error detection circuit 206. Therefore, the tag parity error detection circuit 206 sets the flag FLAG of the tag parity error log register 207 shown in FIG. 2J to be "1", and makes the index value INDEX equal to the address of the entry in which the parity error has occurred. In addition, the tag parity error detection circuit 206 outputs tag information in which the status STATUS related to the entry and shown in FIG. 2H is corrected into I to the primary cache access control circuit 204.

Figure 17:
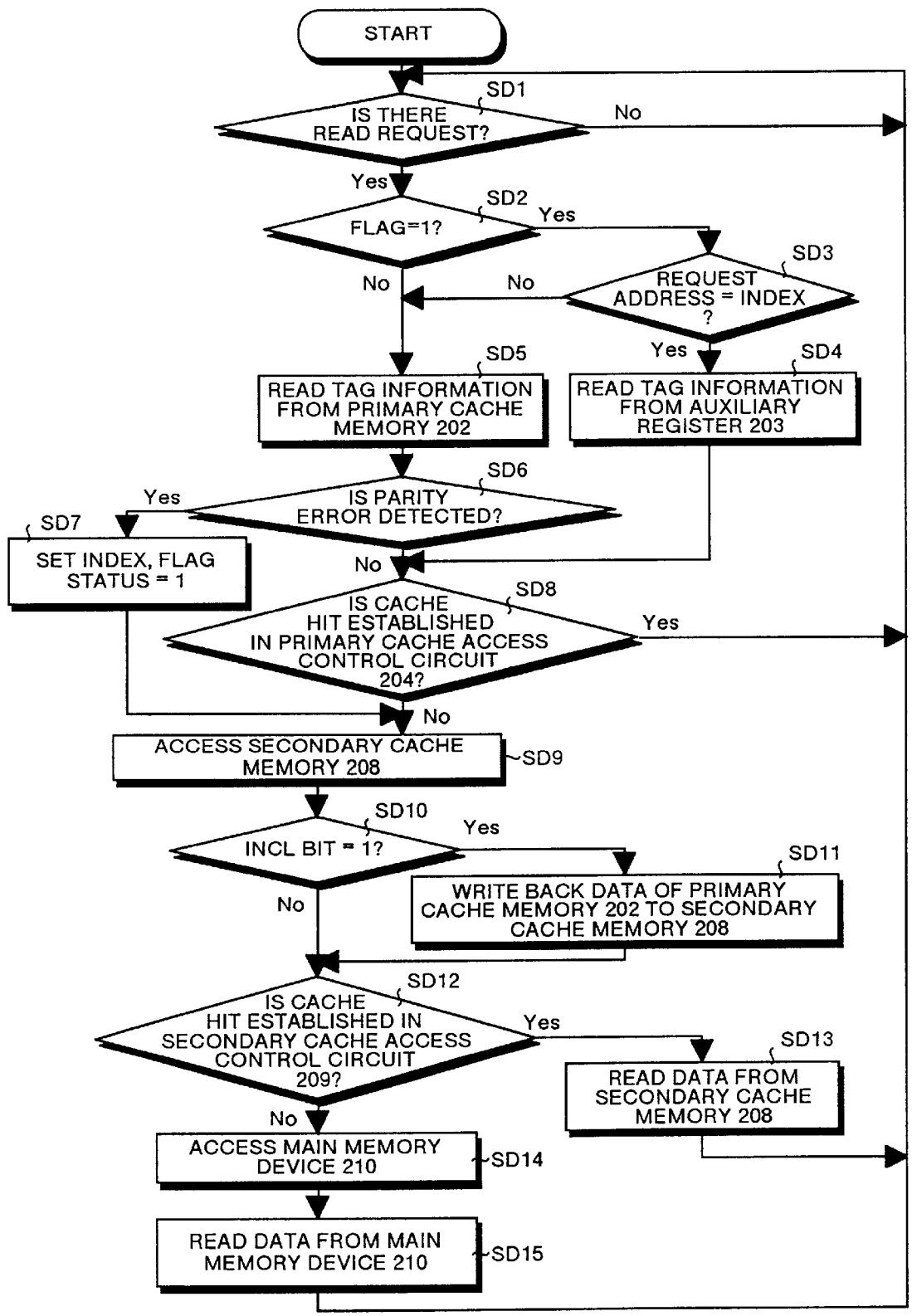
FIG. 17 is a flow chart for explaining the operation of the second embodiment.

In this manner, when a read request is output from the CPU 201 in step SD1 shown in FIG. 17 while a parity error occurs, in step SD2, the primary cache access control circuit 204 checks whether the flag FLAG shown in FIG. 2J is "1" in tag information from the tag parity error detection circuit 206 or not. In this case, the primary cache access control circuit 204 sets the check result in step SD2 to be "Yes", and shifts the process to step SD3. In step SD3, the primary cache access control circuit 204 checks whether the address which is requested to be read from the CPU 201 is equal to the index value INDEX (see FIG. 2J) related to the address at which the parity error has occurred. When the index value INDEX is equal to the address, the primary cache access control circuit 204 sets the check result in step SD3 to be "Yes" and shifts the process to step SD4. In this case, a switching operation to the auxiliary register 203 is performed by the selection circuit 205. When the check result in step SD3 is "No", the process in step SD5 is executed.

In step SD4, the primary cache access control circuit 204 reads the tag information shown in FIG. 2H from the auxiliary register 203, and shifts the process to step SD8. In step SD8, on the basis of the tag information, the primary cache access control circuit 204 checks whether cache hit is established or not. In this case, since the status STATUS shown in FIG. 2H is set to be I (invalid), cache miss is established. Therefore, the primary cache access control circuit 204 sets the check result in step SD8 to be "No", and shifts the process to step SD9. The primary cache access control circuit 204 outputs an access request to the secondary cache access control circuit 209 to perform control for accessing the secondary cache memory 208.

In step SD10, the secondary cache access control circuit 209 accesses the secondary cache memory 208 to check whether the INCL bit related to the address and shown in FIG. 2I is "1" or not, i.e., whether the data related to the address exists in the primary cache memory 202 or not. In this case, it is assumed that the INCL bit is "1", the secondary cache access control circuit 209 sets the check result to be "Yes", and shifts the process to step SD11. In step SD11, the secondary cache access control circuit 209 requests the primary cache access control circuit 204 to perform a write back operation.

In this manner, the data of the address held in the primary data RAM 202b of the primary cache memory 202 is written back to the primary cache memory 202. Furthermore, the secondary cache access control circuit 209 performs control such that the data is held in the auxiliary register 203. Thus, data related to an entry in which a parity error has occurred in the primary cache memory 202 is held in the auxiliary register 203. It is needless to say that, in the second embodiment, the data of the address held in the primary data RAM 202b of the primary cache memory 202 may be written back to the main memory device 210, and the data may be held in the auxiliary register 203.

In the next step SD12, the secondary cache access control circuit 209 checks whether an address related to an access request from the CPU 201 exists in the secondary tag RAM 208a or not, i.e., whether cache hit is established or not. In this case, since the check result is "Yes", the data of the address is read from the secondary cache memory 208 in step SD13.

When a read request is output from the CPU 201 in step SD1 while the parity error does not occur, it is checked in step SD2 whether the flag FLAG shown in FIG. 2J is "1" or not in the tag information from the tag parity error detection circuit 206. In this case, since the parity error does not occur, the primary cache access control circuit 204 sets the check result in step SD2 to be "No", and shifts the process to step SD5. In step SD5, the primary cache access control circuit 204 accesses the primary cache memory 202 to read the tag information from the primary tag RAM 202a. In step SD6, it is checked whether a parity error is detected by the tag parity error detection circuit 206. When the check result is "No", the processes in steps subsequent to the step SD8 are performed.

When a parity error is detected, in step SD7, the tag parity error detection circuit 206 sets the flag FLAG of the tag parity error log register 207 shown in FIG. 2J to be "1" and makes the index value INDEX equal to the address of the entry in which the parity error occurs. Further, the tag parity error detection circuit 206 outputs tag information in which the status STATUS related to the entry and shown in FIG. 2H is corrected into I to the primary cache access control circuit 204. Subsequently, the operation which has already been explained above is performed.

When the check result in step SD12 is "No", the main memory device 210 is accessed in step SD14, and the data of the address is read from the main memory device 210 in step SD15.

As described above, according to the second embodiment, when a parity error occurs in the entry of the primary cache memory 202, the auxiliary register 203 is used as a backup in place of the entry. Resultantly, the apparatus can be operated as if a parity error has not occurred. Thus, because of the provision of the auxiliary register 203, even if a parity error occurs in the primary cache memory 202, system down is avoided, and the reliability of the apparatus is improved. The configuration of the second embodiment can be realized by adding a simple circuit (i.e. the auxiliary register 203) to an existing circuit.

The first and second embodiments according to the present invention have been described above. However, a concrete configuration is not limited only to these two embodiments, and changes and modifications may be included in the present invention without departing from the spirit and scope of the present invention. For example, in the first and second embodiments described above, a program for realizing the functions of the cache memory apparatus described above is recorded on a computer readable recording medium 400 shown in FIG. 18, and a program for controlling the cache memory is recorded on the recording medium 400 is loaded on a computer 300 and executed, so that cache memory control may be executed.

Figure 18:
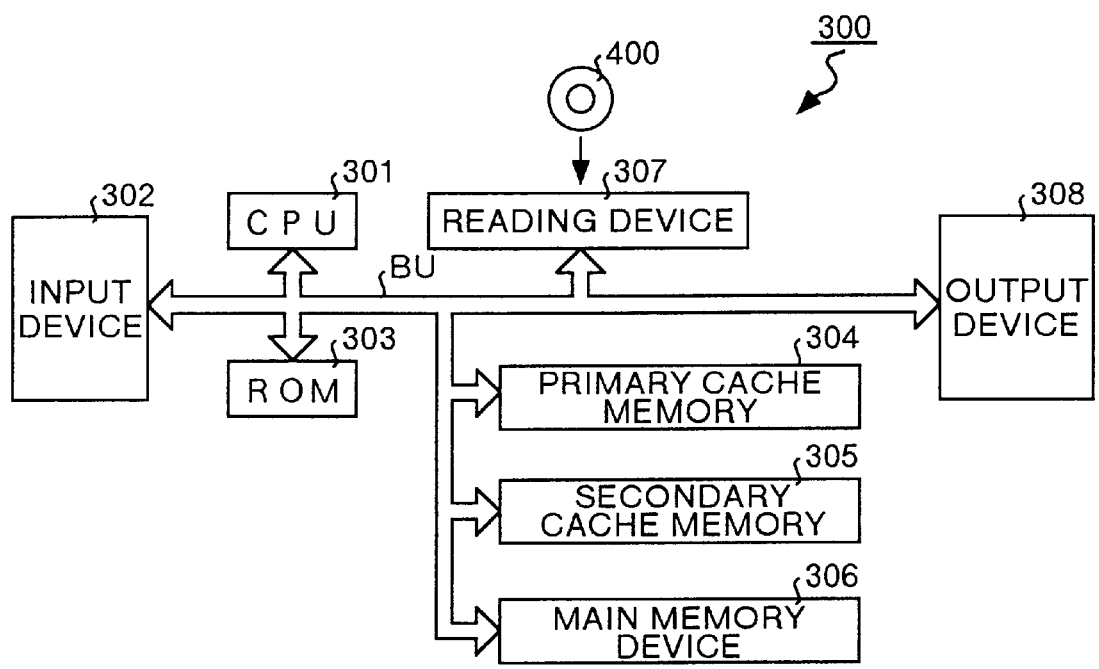
FIG. 18 is a block diagram showing a modification of the first and second embodiments.
Figure 19:
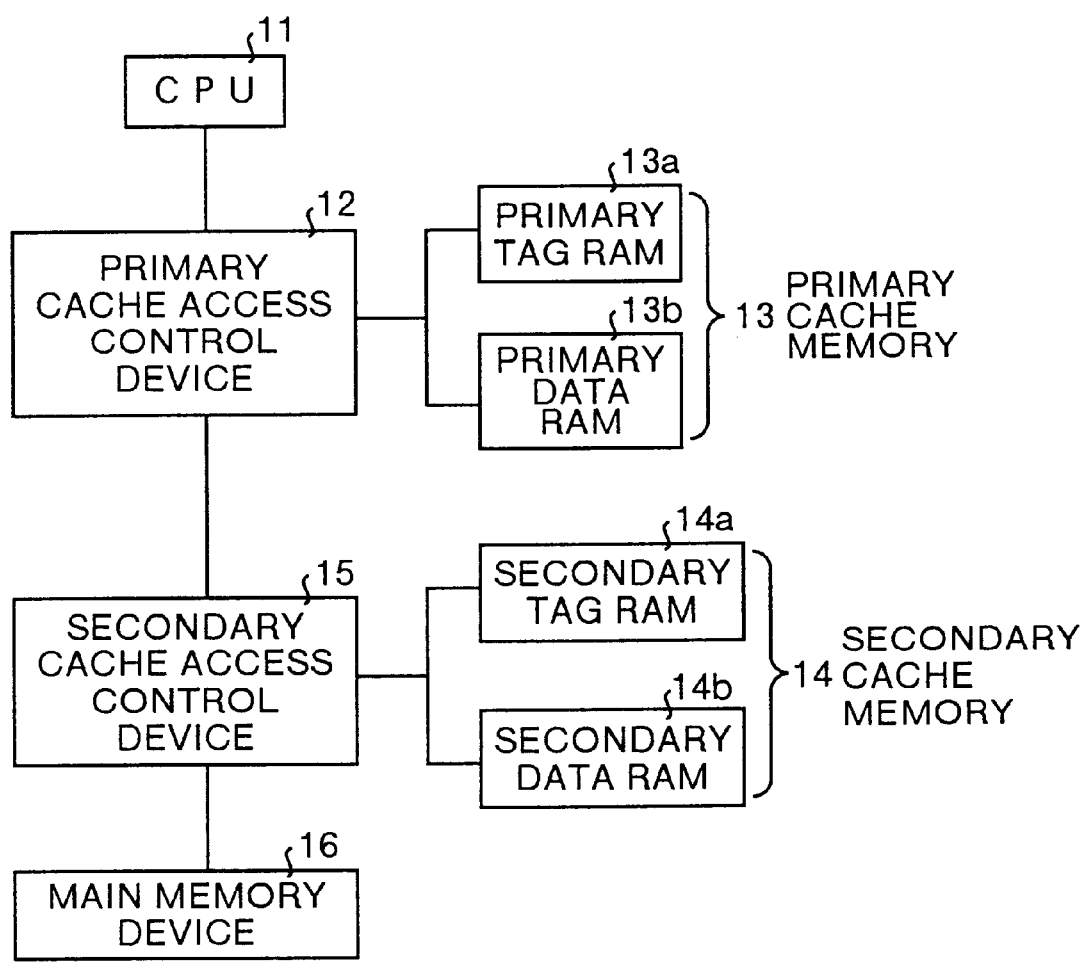
FIG. 19 is a block diagram showing the configuration of a conventional cache memory apparatus.

The computer 300 shown in FIG. 18 is constituted by a CPU 301 for executing the program for controlling the cache memory, an input device 302 such as a keyboard, a mouse, or the like, a ROM (Read Only Memory) 303 for storing various data, a primary cache memory 304 for storing data, a secondary cache memory 305 for storing data, a main memory device 306 for storing data, a reading device 307 for reading the program for controlling the cache memory from the recording medium 400, an output device 308 such as a display, a printer, or the like, and a bus BU for connecting the parts of the apparatus. The primary cache memory 304, the secondary cache memory 305, and the main memory device 306 correspond to the primary cache memory 102, the secondary cache memory 110, and the main memory device 112 (see FIG. 1) in the first embodiment, respectively, and also correspond to the primary cache memory 202, the secondary cache memory 208, and the main memory device 210 (see FIG. 16) in the second embodiment, respectively.

The CPU 301 loads the program for controlling the cache memory stored in the recording medium 400 through the reading device 307 and then executes the program for controlling the cache memory to control the primary cache memory 304, the secondary cache memory 305, and the main memory device 306. The recording medium 400 includes a portable recording medium such as an optical disk, a floppy disk, or a hard disk, and also includes a transmission medium such as a network for temporarily storing and holding data.

In a cache memory apparatus of the present invention, the functions of the replace prohibition unit and the release unit may be stopped when the status information related to an entry in which the error is detected is invalid.

Since the functions of the replace prohibition unit and the release unit are stopped when the status information related to the entry in which the error is detected is invalid in the primary cache memory, the status of the primary cache memory can be returned to the status before the parity error occurs by the functions of the write back unit and the write unit.

As described above, according to one aspect of the present invention, when a parity error occurs, data is written back from the primary cache memory to the secondary cache memory, and the data is written from the second cache memory into the primary cache memory. Accordingly, even if a parity error occurs, the data can be normally read from the secondary cache memory. Therefore, even if a parity error occurs in the primary cache memory, system down is avoided, and the reliability of the apparatus is greatly improved.

Further, according to another aspect of the present invention, when a parity error occurs, data is written back from the primary cache memory to the secondary cache memory, and the data is written from the secondary cache memory into the primary cache memory. Accordingly, even if a parity error occurs in the primary cache memory, system down is avoided, and the reliability of the apparatus is greatly improved. In addition, since an object to be prohibited from being replaced is narrowed to an entry, the advantage that another entry which can be used in the corresponding way is not prohibited from being accessed can be achieved.

Further, according to still another aspect of the present invention, a write back operation is performed at the moment an error is detected by the error detection unit. Therefore, a period of time extending from when a parity error occurs to when the status of the primary cache memory is returned to the status before the parity error occurs can be advantageously shortened.

Further, according to still another aspect of the present invention, a write back operation is performed at any time after an error is detected by the error detection unit. Therefore, the advantage that, when a parity error occurs, the parity error does not adversely affect another entry pending can be achieved.

Further, according to still another aspect of the present invention, when a parity error occurs in an entry of the primary cache memory, an auxiliary memory is used as a backup in place of the entry. Resultantly, the cache memory apparatus can be advantageously operated as if a parity error has not occurred.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A cache memory apparatus comprising:
    a primary cache memory having at least one way, which way having at least one entry;
    an error detection unit which detects an error in an entry of the way;
    a secondary cache memory which holds data, a registration position information and a status information of data in said first cache memory;
    a replace prohibition unit which, when error is detected in an entry of a way by said error detection unit, prohibits that particular way from being replaced;
    a write back unit which, when an error is detected in an entry of a way by said error detection unit, writes back the data held in that particular entry of the way in said primary cache memory to an entry of said secondary cache memory;
    a release unit which releases the prohibition of replacement of that particular way of said primary cache memory upon completion of the write back operation by said write back unit; and
    a write unit which, when the entry of said secondary cache memory is accessed, writes the data which is written back in the entry in said primary cache memory.

2. The cache memory apparatus according to claim 1, wherein said write back unit executes the write back operation at the instant the error is detected by said error detection unit.

3. The cache memory apparatus according to claim 1, wherein said write back unit executes the write back operation at any timing after the error is detected by said error detection unit.

4. A cache memory apparatus comprising:
    a primary cache memory having at least one way, which way having at least one entry;
    an error detection unit which detects an error in an entry of the way;
    a secondary cache memory which holds data, a registration position information and a status information of data in said first cache memory;
    a replace prohibition unit which, when error is detected in an entry of a way by said error detection unit, prohibits that particular entry of the way from being replaced;
    a write back unit which, when error is detected in an entry of a way by said error detection unit, writes back the data held in that particular entry of the way in said primary cache memory to an entry of said secondary cache memory;
    a release unit which releases the prohibition of replacement of that particular entry of the way in said primary cache memory upon completion of the write back operation by said write back unit; and
    a write unit which, when the entry of said secondary cache memory is accessed, writes the data which is written back in the entry in said primary cache memory.

5. The cache memory apparatus according to claim 4, wherein said write back unit executes the write back operation at the instant the error is detected by said error detection unit.

6. The cache memory apparatus according to claim 4, wherein said write back unit executes the write back operation at any timing after the error is detected by said error detection unit.

7. A cache memory apparatus comprising:
    a primary cache memory having a plurality of entries;
    an auxiliary memory having a plurality of entries whose bit fields are equal to those of entries in said primary cache memory;
    an error detection unit which detects an error in an entry of said primary cache memory;
    a secondary cache memory which holds data, a registration position information and a status information of data in said first cache memory;
    an auxiliary memory selection unit which, when an error is detected in an entry of said primary cache memory, makes a corresponding entry in said auxiliary memory valid in place of the entry of said primary cache memory in which the error has occurred;
    a write back unit which, when an error is detected in an entry of said primary cache memory, writes back the data held in that particular entry of said primary cache memory to an entry of said secondary cache memory; and
    a write unit which writes the data which is written back in an entry in said auxiliary memory upon completion of the write back operation by said write back unit.

8. A computer readable recording medium on which a program for controlling a cache memory is recorded thereon, which program causes a computer to execute:
    an error detection step of detecting an error in an entry of a way of a primary cache memory, which primary cache memory having at least one way, and which way having at least one entry;
    a replace prohibition step of, when an error is detected in an entry of a way in the error detection step, prohibiting that particular way from being replaced;
    a write back step of, when an error is detected in an entry of a way in the error detection step, writing back the data held in that particular entry of the way in said primary cache memory to an entry of a secondary cache memory, which secondary cache memory holds data, registration position information and status information of data in said primary cache memory;

a release step of releasing the prohibition of replacement of that particular way of said primary cache memory upon completion of the write back operation in the write back step; and a write step of, when the entry of said secondary cache memory is accessed, writing the data which is written back in the entry in said primary cache memory.

9. A computer readable recording medium on which a program for controlling a cache memory is recorded thereon, which program causes a computer to execute:

an error detection step of detecting an error in an entry of a way of a primary cache memory, which primary cache memory having at least one way, and which way having at least one entry;

a replace prohibition step of, when an error is detected in an entry of a way in the error detection step, prohibiting that particular entry from being replaced;

a write back step of, when an error is detected in an entry of a way in the error detection step, writing back the data held in that particular entry of the way in said primary cache memory to an entry of a secondary cache memory, which secondary cache memory holds data, registration position information and status information of data in said primary cache memory;

a release step of releasing the prohibition of replacement of that particular entry of said primary cache memory upon completion of the write back operation in the write back step; and a write step of, when the entry of said secondary cache memory is accessed, writing the data which is written back in the entry in said primary cache memory.

10. A computer readable recording medium on which a program for controlling a cache memory is recorded thereon, which program causes a computer to execute:

an error detection step of detecting an error in an entry of a primary cache memory, which primary cache memory having a plurality of entries;

an auxiliary memory selection step of, when an error is detected in the error detection step, making an auxiliary memory valid in place of the entry of said primary cache memory in which the error has occurred, which auxiliary memory having a plurality of entries whose bit fields are equal to those of entries in said primary cache memory;

a write back step of, when an error is detected in the error detection step, writing back the data held in that particular entry in said primary cache memory to an entry of a secondary cache memory, which secondary cache memory holds data, a registration position information and a status information of data in said first cache memory; and a write step of writing the data which is written back in an entry in said auxiliary memory upon completion of the write back operation in the write back step.

* * * * *